United States Patent
Choi et al.

(10) Patent No.: US 10,099,945 B2
(45) Date of Patent: *Oct. 16, 2018

(54) ION CONCENTRATION POLARIZATION-ELECTROCOAGULATION HYBRID WATER TREATMENT SYSTEM

(71) Applicant: Massachusetts Institute of Technology, Cambridge, MA (US)

(72) Inventors: Siwon Choi, Cambridge, MA (US); Jongyoon Han, Bedford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/815,803

(22) Filed: Nov. 17, 2017

(65) Prior Publication Data

US 2018/0141832 A1    May 24, 2018

Related U.S. Application Data

(63) Continuation of application No. 14/857,133, filed on Sep. 17, 2015, now Pat. No. 9,850,146, which is a continuation-in-part of application No. 14/306,607, filed on Jun. 17, 2014, now Pat. No. 9,845,252.

(60) Provisional application No. 61/836,756, filed on Jun. 19, 2013.

(51) Int. Cl.
    *C02F 1/46*  (2006.01)
    *C02F 1/463*  (2006.01)
    *B01D 61/42*  (2006.01)
    *C02F 1/469*  (2006.01)
    *C02F 103/08*  (2006.01)

(52) U.S. Cl.
    CPC ............ *C02F 1/463* (2013.01); *B01D 61/42* (2013.01); *C02F 1/469* (2013.01); *B01D 2311/2642* (2013.01); *C02F 1/4604* (2013.01); *C02F 2103/08* (2013.01); *C02F 2201/46115* (2013.01)

(58) Field of Classification Search
    None
    See application file for complete search history.

(56) References Cited

U.S. PATENT DOCUMENTS 9,845,252 B2 *  12/2017  Kwak ................... C02F 1/469
9,850,146 B2 *  12/2017  Choi et al. ............ C02F 1/463

\* cited by examiner

*Primary Examiner* — Arun S Phasge
(74) *Attorney, Agent, or Firm* — Elmore Patent Law Group, P.C.; Carolyn Elmore

(57) ABSTRACT

Between two juxtaposed similar ion exchange membranes (AEMs or CEMs), an ion depletion zone and ion enrichment zone are generated under an electric field. As cations are selectively transferred through the CEMs, for example, anions are relocated in order to achieve electro-neutrality, resulting in the concentration drop (increase) in ion depletion (enrichment) zone. The use of a sacrificial metal anode allows electrocoagulation (EC) concurrently with ICP thereby permitting concentration of both ionic and non-ionic impurities to occur at the same time within the same cell or device.

20 Claims, 46 Drawing Sheets a) $N=1/2$ b) $N=1/2$ $d_{de}$: ion depletion boundary layer
$d_{en}$: ion enrichment boundary layer

ION CONCENTRATION POLARIZATION-ELECTROCOAGULATION HYBRID WATER TREATMENT SYSTEM

RELATED APPLICATIONS

This application is a continuation of U.S. application Ser. No. 14/857,133, filed on Sep. 17, 2015, which is a continuation-in-part of U.S. application Ser. No. 14/306,607 filed on Jun. 17, 2014, which claims the benefit of U.S. Provisional Application No. 61/836,756, filed on Jun. 19, 2013. The entire teachings of the above applications are incorporated herein by reference.

GOVERNMENT SUPPORT

This invention was made with Government support under Grant No. DE-AR0000294 awarded by the Department of Energy. The government has certain rights in the invention.

BACKGROUND OF THE INVENTION

Fresh water is no longer considered a 'free' resource of nature. It is common knowledge that much of the freshwater sources in the world today are polluted and not adequate for human consumption. A bottle of clean, purified water is currently sold at a higher price than that of oil. Polluted drinking water creates various forms of water related diseases, such as anemia, arsenicosis, cholera, malaria, and lead poisoning. Advanced countries and companies notice that this water shortage problem will become worse, and counteract by securing water-related technologies to monitor, clean, move, store, and dispose waters. The topics of particular and major technological and societal interest on the water-energy *nexus* are the development of:
  (a) water desalination technology—more scalable (potable), inexpensive, and efficient devices to remove salts from brackish/seawater/produced water,
  (b) water purification technology—more scalable (potable), inexpensive, and efficient devices to remove detrimental biological agents and other contaminants, including toxins, proteins, bacteria, cells and colloidal pollutant particles.
  (c) water monitoring technology—more scalable (potable), inexpensive, and time-economical devices to preconcentrate/detect detrimental biological agents (especially for ultra-low concentration targets, e.g. *Escherichia coli*).

Prior attempts to use ion concentration polarization to desalinate water had difficulties in that the electrodes were connected to the ICP zones with long microchannels creating unnecessary power consumption along the way. In addition, electrodes exposed directly to the desalting flow, and allow them to affect the systems performance and the quality of desalted water by Faradic/chemical reactions. For example, chlorine ions which are the most abundant ions in ground water, can be oxidized and disproportionated at anode, generating poisonous chlorine gas and hydrochloric acid (HCl)/hypochlorous acid (HOCl), respectively. With the problems on the water quality, the additional hydrogen ion ($H^+$) production can worsen the energy consumption to reject those ions. The standard potential of the chlorine oxidation is only 1.39V, so corresponding pH change by its disproportionation in aqueous solutions was observed even in capacitive deionization (CDI) operated under 2 V. Improvements in such technologies are required.

Electrocoagulation (EC) is an electrochemical water treatment method, in which the metal ions released from the anode results in coagulation. The electrolysis of a sacrificial metal anode acts as a coagulant to destabilize colloidal particles that may be difficult to remove. Traditional EC is effective at removing suspended solids, organic hydrocarbons, and biological organisms, which are typically larger than salt ions. The resulting floc can be removed by physical separation methods, such as sedimentation or flotation. Typically, traditional EC removes small particles and little salt is removed during the process.

SUMMARY OF THE INVENTION

We have developed the en bloc desalination/purification method (removing salt ions, colloidal pollutant particles and charged bio-agents simultaneously) from brackish or contaminated water by nonlinear ion concentration polarization (ICP) phenomenon between two identical ion exchange membranes (IEMs). The consequence of the configuration is that only positive (or negative) ions, but not both, participate in the conduction. Through visualizing and tracing conductivity, dye concentration, and particle movement, we have demonstrated the production of fresh drinkable water by eliminating salt ions, dyes and particles. The desalting performance is not only predictable by the scaling law governing electroconvection (EC) zone height, but it is also stable and remains unaffected from possible chemical reactions at the electrodes. Through the comparison between standard electrodialysis (ED) systems, we reveal and quantify the enhancement of desalination energy and current efficiency of ICP desalination for the first time. We have also developed a straightforward strategy to scale up the demonstrated platform for commercialization, by stacking the unit platforms in parallel, just as in ED.

Ion exchange membranes (IEMs) act as an ion filter by allowing only cations or anions to pass through. This selective ion transport initiates a unique phenomenon called ion concentration polarization (ICP) near the membranes, which is characterized by significant, dynamic perturbation in ion concentrations (also known as ion depletion and ion enrichment)[1, 2]. In 2010, S. J. Kim et al. demonstrated a microfluidic desalination device by using ICP. Two disadvantages of this technology include chemical reactions and pH changes near electrodes and difficulties in scale-up[3]. Here, in this invention, we demonstrate a robust desalination/purification platform by utilizing ICP between two identical IEMs.

Between two juxtaposed similar ion exchange membranes (AEMs or CEMs), an ion depletion zone ($d_{de}$) and ion enrichment zone ($d_{en}$) are generated under an electric field (FIG. 1a). As cations are selectively transferred through the CEMs, for example, anions are relocated in order to achieve electro-neutrality, resulting in the concentration drop (increase) in ion depletion (enrichment) zone. The concentration drop (or salt removal) is low and spatially gradual at relatively low voltage or current (e.g. Ohmic regime). However, at higher voltage or current (e.g. overlimiting regime), strong electroconvective vortex accelerates cation transport through CEMs, allowing us to "relocate" most salt ions (FIG. 1b). The flat depletion zone occurs with significantly low ion concentration, and corresponding strong electric field in the zone, and any charged agents (e.g., proteins and bacteria) cannot penetrate this flat zone[4, 5]. As a result, we can separate and collect the desalted/purified flow from brine flow by bifurcating the channel at the end of the CEMs. This ICP desalination/purification also happens with two anion exchange membranes (AEMs) by relocating cations, but the location of desalted/brine flows are converted (FIG. 1). In a first embodiment, the invention relates to a method of purifying water and/or concentrating materials in a water stream. In general, the method produces two streams, one which has reduced ionic species (purified water) and one that has concentrated ionic species (concentrated stream). Thus, the two terms, purifying and concentrating can be used interchangeably. The invention relates to a method of purifying and/or concentrating a first water stream containing ionic impurities comprising: directing the water stream in a channel comprising an inlet and an outlet and defined, at least in part, by two juxtaposed ion exchange membranes, wherein the ion exchange membranes are characterized by the same charge, applying an electric field across the water stream channel; whereby, an ion depletion zone ($d_{de}$) comprising a purified water stream and an ion enrichment zone ($d_{en}$) comprising a concentrated ion aqueous stream are generated and ions are transferred through the ion exchange membranes; and collecting the purified water stream and/or the concentrated ion aqueous stream. In general, the channel formed by the two juxtaposed ion exchange membranes does not contain a membrane carrying a charge counter to the two juxtaposed ion exchange membranes. The consequence of the configuration is that only positive (or negative) ions, but not both participate in conduction. In other words, the ions in the electrolyte solution or aqueous stream to be purified that participate in the conduction in the apparatus, or cell, carry a common charge, while the counterions, or ions carrying the opposite charge, while present, do not participate in conduction. Thus, the invention preferably excludes the use of an apparatus that traditionally functions via electrodialysis.

The ion exchange membranes are cationic or anionic exchange membranes. The two membranes can be the same or different. Strong anion or cation exchange membranes, as those products are generally sold in the art, are preferred. FUMASEP® FTAM-E and FTCM-E (FuMA-Tech CmbH, Germany) are suitable membranes. However, others can also be used. In particular, the term "ion exchange membrane" is intended to include not only porous, microporous or nanoporous films but also resins or materials through which ions can pass. Thus, in one embodiment, an ion exchange resin can be entrapped by one or more meshes (or porous membranes) in lieu of or in addition to one or more of the ion exchange membranes.

The ion exchange membranes can be placed into a support, such as glass, polydimethylsiloxane or other inert material. Thus, the support can also contribute to the formation of the channels.

The method results in an ion depletion zone and parallel ion enrichment zone running along the length of the chamber. At the outlet of the chamber, the streams in one or both zones can be collected. This can be conveniently accomplished by the bifurcation of the chamber at or near the outlet. In one embodiment, a nonionic membrane can be placed proximal to the boundaries of these zones to separate or bifurcate the zones and collect one or both streams.

As described herein, the inventors have characterized the fluid flow of the device using current-voltage responses categorized as Ohmic (1-2 V), limiting (2-2.5V) and overlimiting (>2.5 V) regimes. The electric field preferably creates a boundary layer comprising at least one electroconvective vortex proximal to at least one of the two juxtaposed ion exchange membranes.

The electric field is created by an electrode and a ground, each located external and parallel to the channel. In general, the electrode forms a second channel with the first of said two juxtaposed ion exchange membranes and the ground forms a third channel with the second of said two juxtaposed ion exchange membranes. These channels are generally filled with an electrolyte solution, which can conveniently be the water stream to be purified or concentrated.

One aspect of our invention combines the concepts of ICP and EC in one step. The device comprises an electrolytic cell with a cation exchange membrane (CEM) that separates the solutions in contact with anode and cathode respectively. Through this CEM, only cations can be transported according to the direction of the electric field applied. The anode is composed of a metal, typically aluminum or iron, and is used to provide metal ions for electrocoagulation.

Because our invention can remove both salt and nonionic particles, it is appropriate to discuss its advantage over other desalination and particle removal technologies. Many desalination systems require either a very high energy input (thermal evaporation technology) or complicated pre-treatment steps to remove potential foulants (membrane-based technology). For example, reverse osmosis (RO), the current leading technology for desalination, is a membrane-based technology, and its performance is largely dependent on membrane fouling. Proper functioning of RO requires pre-treatment to remove potential foulants, such as suspended solids or bacteria. Another desalination technology is electrodialysis (ED). In ED, salt can be removed, and nonionic particles remain in the solution. In RO and ED, particle removal needs to be done prior to desalination. Our ICP-EC system does not require a separate pre-treatment device because the desalted zone near the membrane is free of salt or small particles. Our system is advantageous over other membrane-based desalination technologies in reducing membrane fouling.

Since our hybrid system can remove both salt and particles, it has the flexibility to treat various types of wastewater, whether it be brackish groundwater, household water rich in bacteria or other biological contaminants, or simply murky water from various suspended solids and/or industrial heavy metal contaminants.

Our invention has a large advantage in produced water treatment such as found in the shale gas industry, where suspended solids removal is crucial for re-use in hydraulic fracturing. The product from the CEM outlet is free of salt and suspended solids. This water can be used as a fresh feed solution, which is mixed with the produced water, for hydraulic fracturing. Typically, 90% of produced water is recycled in shale gas wells, mixed with fresh feed. Therefore, a relatively small portion of desalinated water may be sufficient to be used as fresh feed in produced water recycling.

Similarly, the ICP-EC system has a wide range of applications in wastewater treatment system. It can be used as a single-device water treatment system. It does not require additional pre-treatment. It will be mainly used for removal of small particles, including suspended solids, oil droplets, organic chemicals, and biological organisms, with a small desalination capacity in addition, since the system is mainly driven by electricity and does not require a high pressure system, it can be made in small scale and is suitable for a localized water treatment system.

This is the first time, to our knowledge, that ICP and EC have been demonstrated simultaneously in one device. By having shared electrodes for the two independent processes, we created a single electrochemical system to achieve both pre-treatment and desalination. Our invention makes use of the unavoidable Faradaic reaction near the anode to remove nonionic particles, reducing the unnecessary voltage drop and thus the energy consumption.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3A: current-voltage curve of the new desalination/purification platform with two CEMs. Current-voltage response is measured by ramping up the voltage by discrete voltage jumps of 0.2 V in every 30 seconds. FIG. 3A-3C: visualized qualitative concentration profiles right before the channel bifurcation (dotted lines in FIG. 3C) with 0.78 μM Alexa Fluor 488. 10 mM NaCl solution flows with 10 μL/min flow rate. Electrodes are rinsed by 10 mM dibasic buffer solution with 30 μL/min flow rate.

FIG. 4A: Conductivities of desalted and brine flows. Conductivity starts to response after 100 sec when the desalted/brine flow reaches the conductivity probe. Even the ICP and desalting happens without time lag, the saturation of conductivities takes long (400 sec) because of relatively large volume of the conductivity probe (17 μL). FIG. 4B: Voltage-time curves at 20, 60, 100, and 200 μA. Voltage responses show 2.5±0.4, 10.1±1.0, 16.9±1.6, and 38.6±5.6 V at 20, 60, 100, and 200 μA, respectively. FIG. 4C: Local concentration profiles and strong EC on the anodic side of the lower CEM at 100 μA visualized with 0.78 μM Alexa Fluor 488. The thickness of depletion zone (dark region on the lower CEM) and that of enrichment zone (bright region on the upper CEM) are nearly constant during the 1000 sec operation. 10 mM NaCl solution flows with 10 μL/min flow rate, and electrodes are rinsed by 10 mM dibasic buffer solution with 30 μL/min flow rate. The channel width and length are 2.38 mm and 5 mm, respectively.

FIG. 5A: fluorescent images and FIG. 5B: fluorescent intensity curves after flow bifurcation when voltage is applied or not. Microparticles are loaded only on the lower part of the flow to visualize its movement clearly. At 40 V, the negative-charged particles move upwards, and the negatively-charged dyes also shifted upwards. As a result, dark region (low fluorescent intensity) of the desalted flow and bright region (high fluorescent intensity) of the brine flow are observed. The spikes on the fluorescent intensity curves indicate the existence of the particles.

FIG. 7A: Fluorescent image of the preconcentrator. Chaotic vortex fluctuation in the lower flow and highly preconcentrated dyes in the upper flow are observed. FIG. 7B: Fluorescent intensity curve right before the bifurcation of the channel (dotted in FIG. 8A). We can clearly observe the rejection of dyes (0.78 μM→78 pM) in the desalted/filtered flow (0-1 mm) and the enrichment of dyes (0.78 μM→18 pM) in the preconcentrated flow (1-2 mm). 10 mM NaCl solution is applied with flow rate 1 and 20 μL/min in the desalted/preconcentrated channels, respectively.

FIG. 8A: fluorescent images, FIG. 8B: fluorescent intensity (dye concentration) curves, and FIG. 8C: current response. When $Q_2$=120 (50) μL/min, the local dye concentration jumps up to 333.3 (179.5) fold, and the average dye concentration in the preconcentrated flow increases up to 153.8 (76.9) fold. 110 V voltage is applied.

FIG. 10A: current-voltage curves of ICP platforms with two CEMs or AEMs and ED with various salts, 10 mM KCl, NaCl, and LiCl. The current response is measured by ramping the voltage up with 0.2 V steps from 0 to 10 V, with 30 sec delay. FIG. 10B: limiting current density (LCD) according to governing ions. 2CEM and 2AEM indicate ICP platforms with two CEMs and AEMs, respectively.

FIG. 11A, FIG. 11B and FIG. 11C: Voltage responses when the constant current is applied, and FIG. 11D, FIG. 11E and FIG. 11F: Salt removal ratio of two types of ICP platform and ED, according to the electrolytes, KCl (FIGS. 11A and 11D), NaCl (FIGS. 11B and 11E), and LiCl (FIGS. 11C and 11F). Voltage responses are measured during 300 sec operation at a constant applied current, and conductivity drops of desalted flows are measured at the end of 300 sec operation after the conductivity value is saturated. Salt removal ratio is calculated as described herein. 2CEM and 2AEM indicate ICP platforms with two CEMs and AEMs, respectively.

FIGS. 12A, 12B and 12C: Voltage responses when the constant current is applied, and FIGS. 12D, 12E and 12F: Salt removal ratio of two types of ICP platform and ED, according to the systems, ED (FIGS. 12A and 12D), ICP with 2CEM (FIGS. 12B and 12C), and ICP with 2AEM (FIGS. 12C and 12F). Voltage responses are measured during 300 sec operation at a constant applied current, and conductivity drops of desalted flows are measured at the end of 300 sec operation after the conductivity value is saturated. Salt removal ratio is calculated as described herein. 2CEM and 2AEM indicate ICP platforms with two CEMs and AEMs, respectively.

FIG. 14A-14C: Energy consumption, FIG. 14D-14F: Energy per ion removal, FIG. 14G-14I Current efficiency, and FIG. 14J-14L: Area efficiency of two types of ICP platform and ED, according to the systems, ED (FIGS. 14A, 14D, 14G and 14J), ICP with 2CEM (FIGS. 14B, 14E, 14H and 14K), and ICP with 2AEM (FIGS. 14C, 14F, 14I and 14L). Three metrics are calculated as described herein. 2CEM and 2AEM indicate ICP platforms with two CEMs and AEMs, respectively.

FIG. 15A: Shift of the salt removal ratios and FIG. 15B: shift of current efficiency of ICP platforms with two CEMs/AEMs from that of ED. 2CEM and 2AEM indicate ICP platforms with two CEMs and AEMs, respectively.

DETAILED DESCRIPTION OF THE INVENTION

A description of preferred embodiments of the invention follows.

Figure 2:
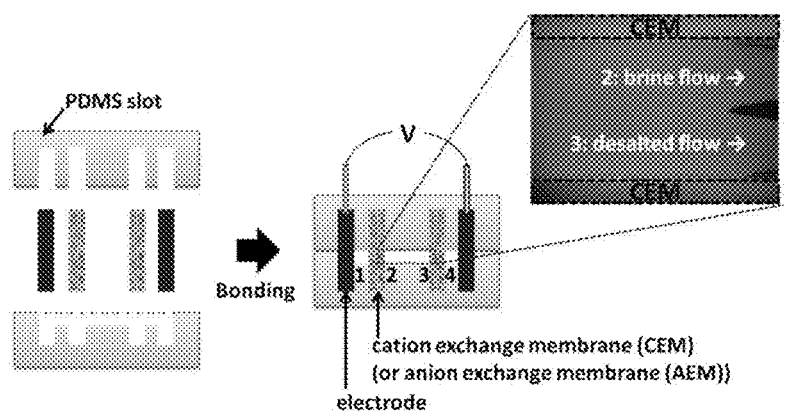
FIG. 2 schematic diagram of the new ICP desalination system before (left) and after assembly (right). Three channels are built between two CEMs (or AEMs) and two electrodes: one channel between two IEMs which are bifurcated as desalted and brine channels (2 and 3), and electrode channels where faradic reaction happens (1 and 4). The channel height and length are 0.2 and 5-10 mm, respectively. The inter-membrane distance between two CEMs is 2 mm.

To demonstrate and characterize desalination/purification of the new platform, the sample device is fabricated by slotting IEMs and electrodes into Polydimethylsiloxane (PDMS) (FIG. 2). In 10 mM NaCl solution as a model of brackish water, fluorescent dye (Alexa Fluor 488, Invitrogen, Carlsbad, Calif.) is added to visualize ICP phenomenon. FUMASEP® FTAM-E, FTCM-E (FuMA-Tech CmbH, Germany), and carbon paper (Fuel Cell Store, Inc., Boulder, Colo.) are used as an AEM, CEM, and electrodes respectively. The detailed fabrication and operating procedures are same described in the Kwak et al. [4], incorporated herein by reference.

Figure 3A:
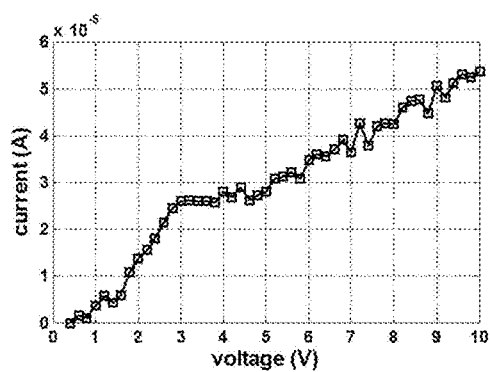
FIG. 3A-3C (collectively referred to herein as FIG. 3, views A, B and C.
Figure 3B:
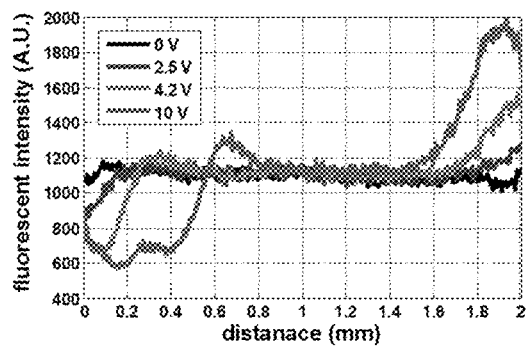
Figure 3C:
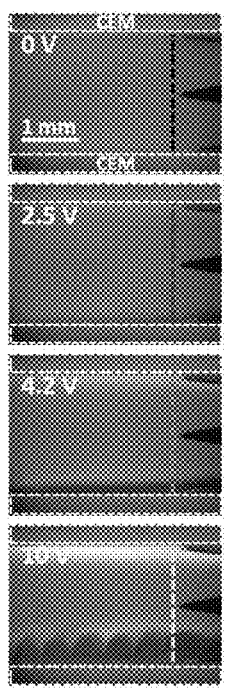

FIG. 3A shows the current-voltage curves and visualized ICP with fluorescent dyes between two CEMs. Typically, current-voltage response can be categorized as Ohmic (0-3 V), limiting (3-4.5 V) and overlimiting (>5 V) regimes[4]. As described by conventional convective-diffusion model [2], a linear concentration drop and increase near the CEMs are observed in Ohmic regime (2.5 V in FIGS. 3B-3C). With such linear concentration changes, only small amount of ions can be rejected/relocated from the anodic side of the CEM. In an overlimiting regime, however, electroconvective vortices and the flat depletion zone are observed (10 V in FIG. 3B-3C); most ions are shifted from the flat zone (dark region on the bottom CEM in FIG. 3C, 10V) to (bright region on the top CEM in FIG. 3C, 10 V).

Figure 4A:
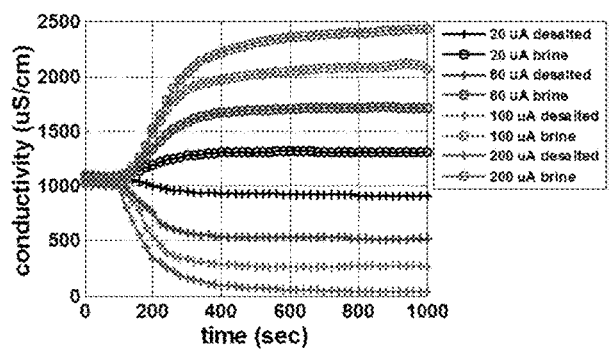
FIG. 4A-4C (collectively referred to herein as FIG. 4, views A-C.
Figure 4B:
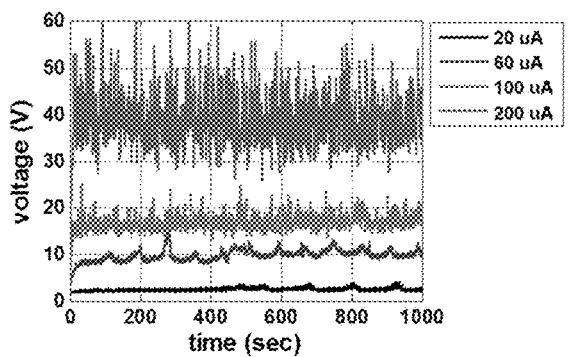
Figure 4C:
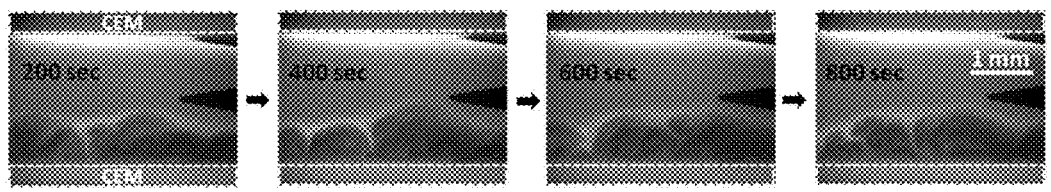

To verify the desalting performance, we trace the conductivity of desalted and brine flows directly by connecting a flow-through conductivity probe (Microelectrode, Inc, Bedford, N.H.) (FIG. 4A). As can be seen in FIG. 4A-4C, the conductivity of desalted flow decreases and the brine flow conductivity increases, as anion relocates by ICP. The desalting performance becomes better as higher applied voltage or current; when 200 µA (or 38.6±5.6 V) is applied, 97% of salt ions are removed from 10 mM NaCl solution. It is noted that the all parameters including current, voltage, and desalt/brine conductivities are saturated and hold the same values. This indicates that the device operates steady and stable (FIGS. 4A-C).

Figure 5A:
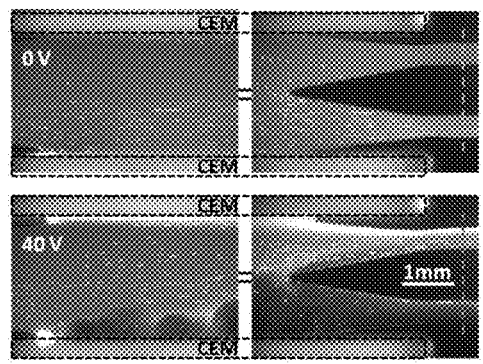
FIG. 5A-B (collectively referred to herein as FIG. 5, views A-B.
Figure 5B:
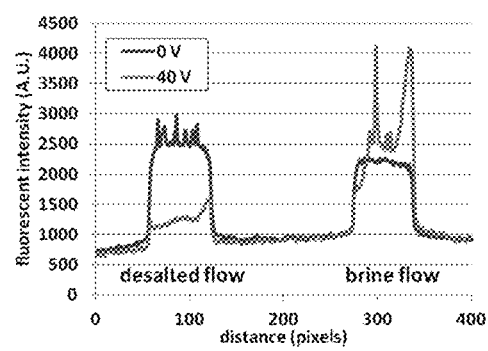

The rejection of charged particles in the depletion zone of ICP has been observed continuously. To validate this rejection on the new ICP platform, we use negatively charged fluorescent dye and particle: Alexa Fluor 488 and 6 µm carboxylate microspheres (Polyscience, Inc, Warrington, Pa.). It is noted that bio-agents in nature are generally negatively charged (e.g. *Escherichia coli*, *Salmonella*, and *Pseudomonas*). Under sufficiently high current or voltage, the depletion zone and EC touch the bifurcated point of the channels (FIGS. 5A and 5B). Then, most dyes and particles in the desalted flow (lower channel) moves upward to the brine flow (upper channel). This shift occurs immediately after voltage or current is applied, and the ion/dye/particle-free flow is produced.

To clarify the difference between ICP desalination platform and ED, cations and anions in ED can move toward the electrodes under the electric field, cations (anions) are 'imprisoned' between two AEMs (CEMs) in the ICP platform. Therefore, if the internal relocation of anions or cations by ICP does not happen for some reason (e.g. very heavy, immobilized ions), the desalted flow will not be produced. The ICP platform can be stacked like the ED system, the cell number N of the system can be used to calculate energy and efficiencies with the same equations for ED. With a fixed geometry, the cell number of ICP platforms are approximately half of ED. The ED system can collect all desalted flows on an AEM and CEM (N=1), but the ICP system only sees half of the desalted flows on the lower CEM or the upper AEM (N=1/2). If we extend the system to reaction channels between the IEMs and the electrodes, we can find the other half of the desalted flow on the anodic side of the upper CEM and on the cathodic side of the lower AEM.

To compare ICP and ED quantitatively, we control or trace all parameters in the two systems, including current or voltage, conductivity, flow rate, device's geometry, etc. We compared five performance metrics to compare the desalination performance between ED and ICP: i) salt removal ratio, ii) energy consumption, iii) energy per ion removal, iv) current efficiency, and v) membrane (electrode) area efficiency.

First, salt removal ratio is a parameter to indicate the desalting ability of devices. By measuring the concentration (or conductivity) of sample flows Co and that of the desalted flow $C_{desalted}$, we can figure out how many salt ions are removed from the discrepancy between the two conductivities. Salt removal ratio is non-dimensional form of the amount of desalted ions by the initial ion concentration (or conductivity):

$$\text{Salt removal ratio} = \frac{C_0 - C_{desalted}}{C_0}. \quad (1.1)$$

The concentrations can be converted from the measured conductivity $\sigma$ in experiments with given molar conductivities of electrolytes. Here, we use only dilute binary electrolytes ($z^+=z^-=1$), 10 mM KCl, NaCl, and LiCl solutions. Then, the equation for conversion is $$C_i[\text{mol}/m^3 = \text{mM}] = \frac{\sigma}{\Lambda_{+,i} + \Lambda_{-,i}} \left[ \frac{S/m}{S \cdot m^2/\text{mol}} \right], \quad (1.2)$$

where $\Lambda_{+,i}$ and $\Lambda_{-,i}$ are the molar conductivity of cation and anion. The molar conductivities of Cl⁻, K⁺, Na⁺, Li⁺ are 7.63, 7.36, 5.01, and 3.87 [$10^3$ S m² mol⁻¹], respectively, which are connected closely with their diffusivity.

To compare different desalination devices, energy consumption is frequently measured. In electrochemical desalination systems, energy consumption for desalination is electrical power consumption (multiplication of current I and voltage V) divided by the flow rate of desalted water $Q_{desalted}$ per one cell:

$$\text{Energy consumption} = \frac{IV}{Q_{desalted}/N} [\text{Wh/L}]. \quad (1.3)$$

While energy consumption is an important metric determining the economic viability of the desalination technique, it cannot represent the desalination energy efficiency of the system. We therefore consider energy consumption to remove a single ion, i.e. energy per ion removal, which can be obtained by dividing energy consumption by the amount of removed ions and non-dimensionalizing by thermal energy $k_B T$(=2.479 kJ/mol):

$$\text{Energy per ion removal} = \frac{NIV/Q_{desalted}}{k_B T(C_0 - C_{desalted})}. \quad (1.4)$$

Energy per ion removal is a parameter representing how efficiently energy is consumed to reject ions by combining the concept of energy consumption and salt removal ratio. However, it is noted that salt removal ratio or the value of conductivity drop should be checked together, because better energy per ion removal does not necessarily represent better desalting performance.

Current efficiency describes the ratio of rejected ions in desalted flow and ions transferred at the electrodes. The following equation is a modified to obtain current efficiency from the concentration differences of initial sample flow and desalted flow:

$$\text{current efficiency} = \frac{zFQ_{desalted}(C_0 - C_{desalted})}{NI}. \quad (1.5)$$

Last, area efficiency represents the amount of desalted ions per unit area of the working membranes or electrodes:

$$\text{Area efficiency} = \frac{(C_0 - C_{desalted})}{A} [\text{mM}/m^2], \quad (1.6)$$

where A is the working area of IEMs here. The most significant cost of an electrochemical desalination system is the membrane cost, therefore higher area efficiency would be economically favorable. However, there is usually a trade-off between area efficiency and energy consumption; if one increases area efficiency to enhance salt removal ratio with a limited size device by applying higher electric potential, energy consumption will increase. If one uses a larger system for better salt rejection at a fixed voltage or current, area efficiency becomes lower.

The three platforms described here, ICP with two CEMs (2CEM) or AEMs (2AEM) and ED, are fabricated to study the differences and any potential advantages of each technique. The height h, width w, and length L of the working channel is 0.2, 2, and 10 mm, respectively. The area of working IEMs is therefore $2 \times 10^{-6}$ m². Three different electrolytes (10 mM KCl, NaCl, and LiCl) with 10 mM concentration are used to observe the effect of asymmetric molar conductivity (or diffusivity) of cation and anion. The flow rate between IEMs is 20 μL/min, so the desalted flow rates $Q_{desalted}$ are 10 μL/min for ICP platform and 20 μL/min for ED. The electrodes are rinsed with the same electrolytes (KCl or NaCl or LiCl) with 30 µL/min; dibasic buffer solution is not used here to supply the same cations or anions within the sample water.

Figure 10A:
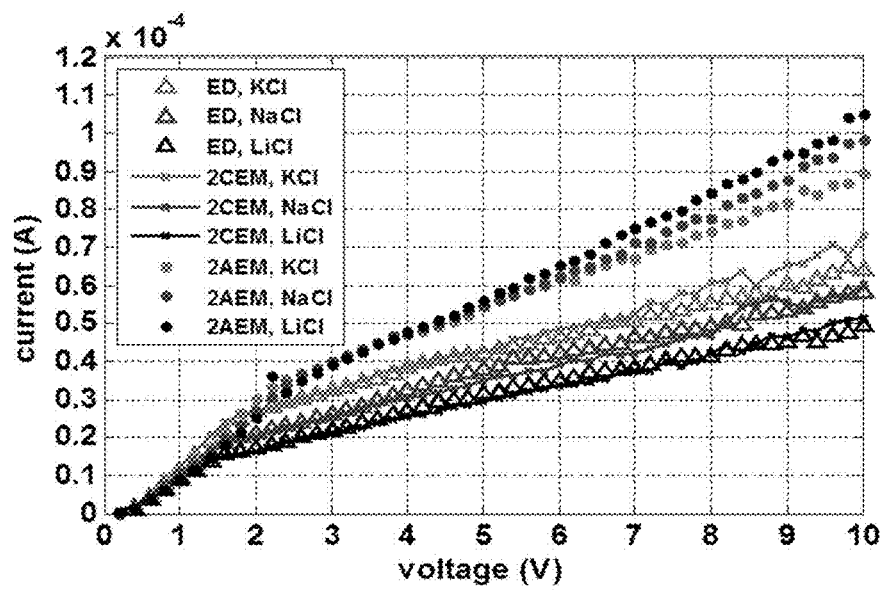
FIG. 10A-B (collectively referred to herein as FIG. 10, views A-B.
Figure 10B:
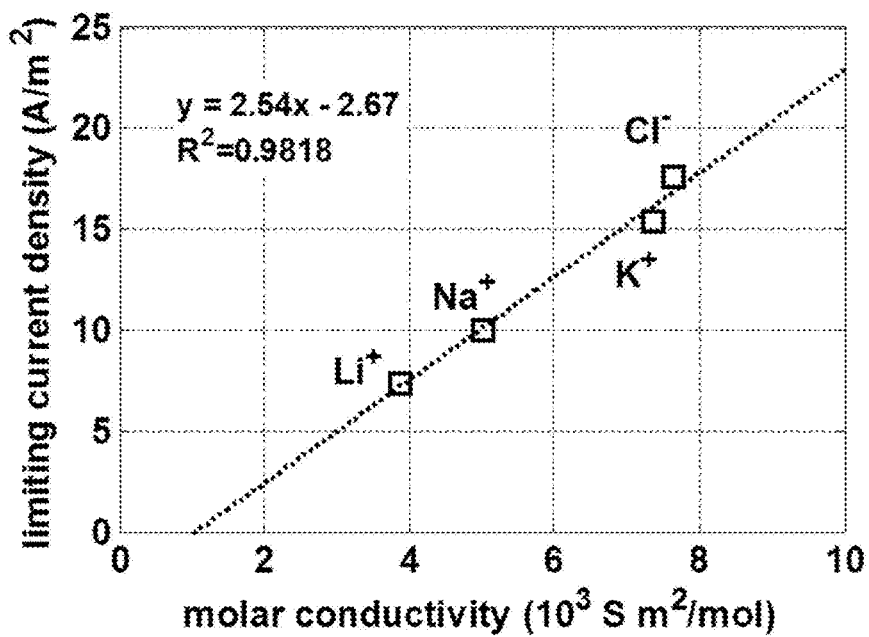
Figure 11A:
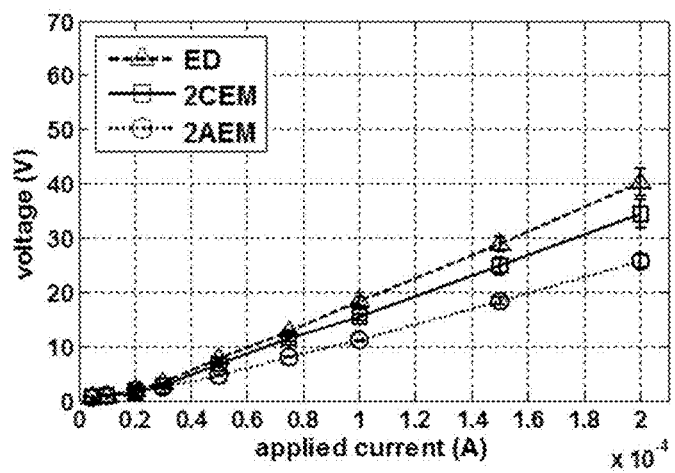
FIG. 11A-F (collectively referred to herein as FIG. 11, views A-F.
Figure 11B:
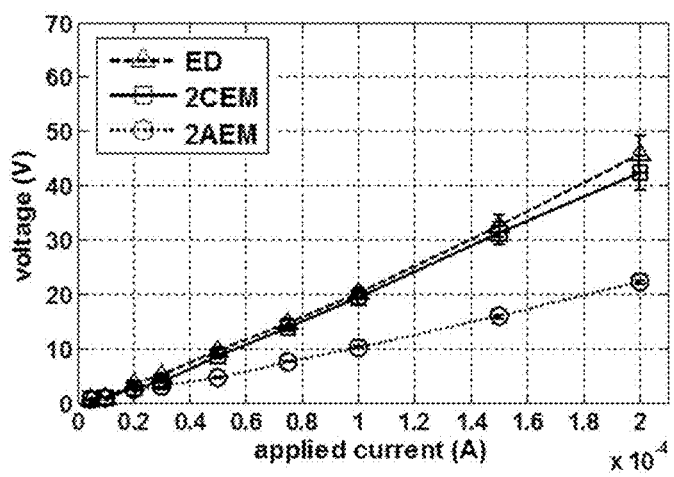
Figure 11C:
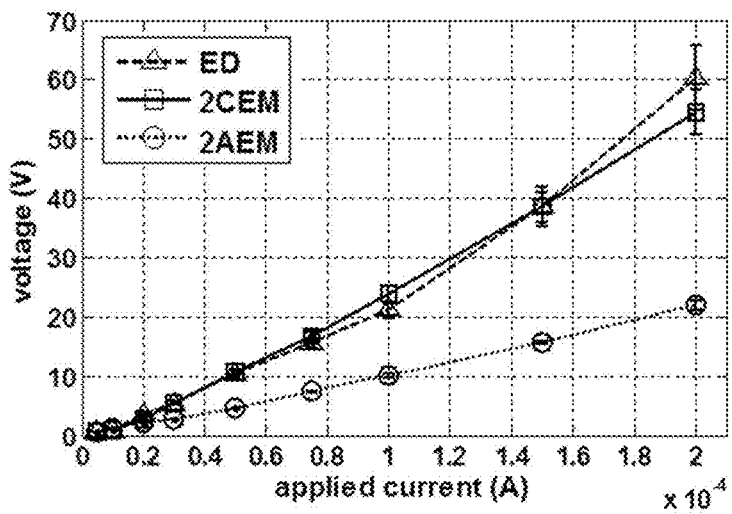
Figure 11D:
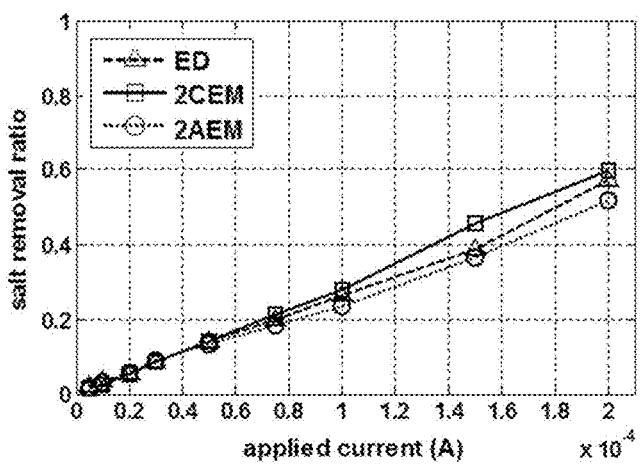
Figure 11E:
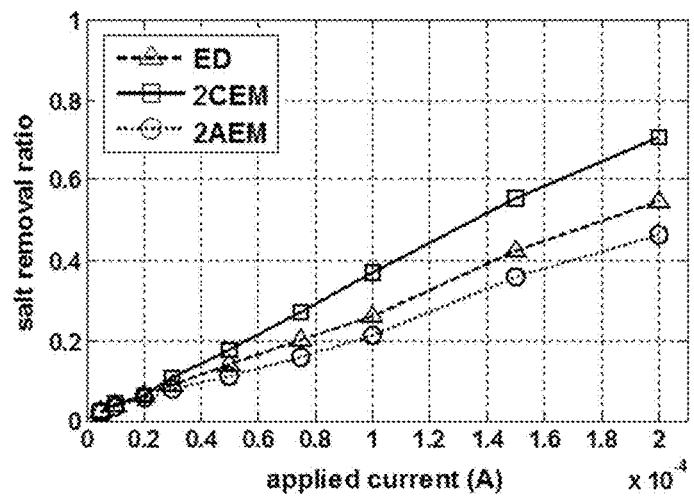
Figure 11F:
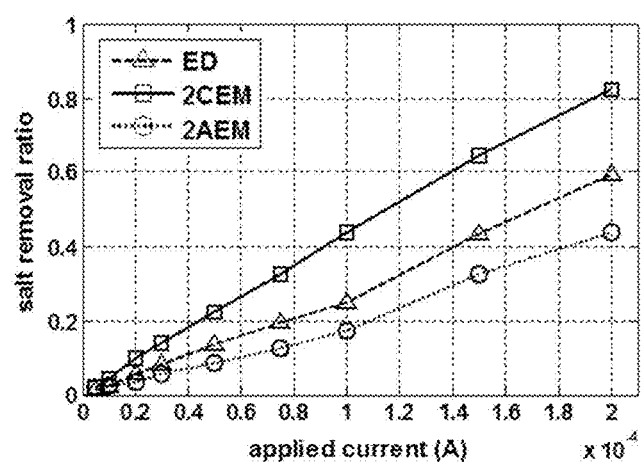
Figure 12A:
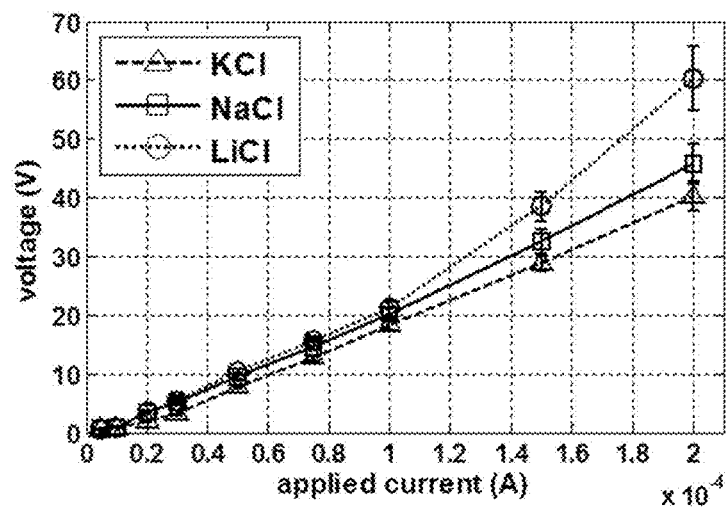
FIG. 12A-F (collectively referred to herein as FIG. 12, views A-F.
Figure 12B:
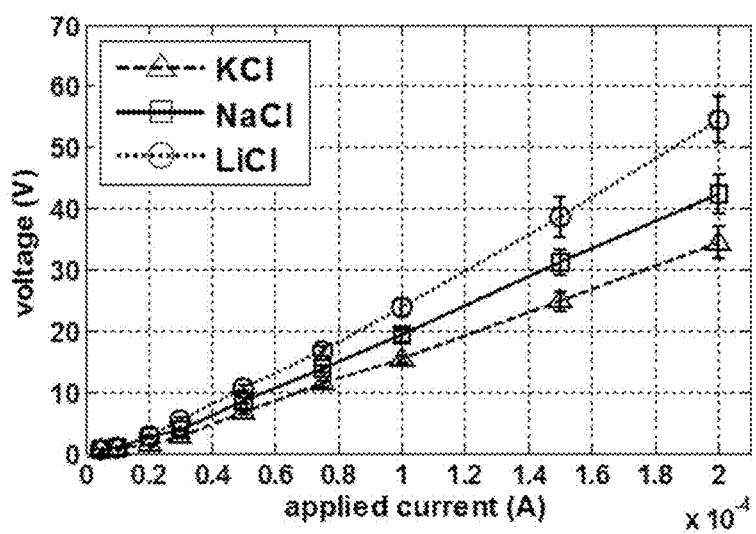
Figure 12C:
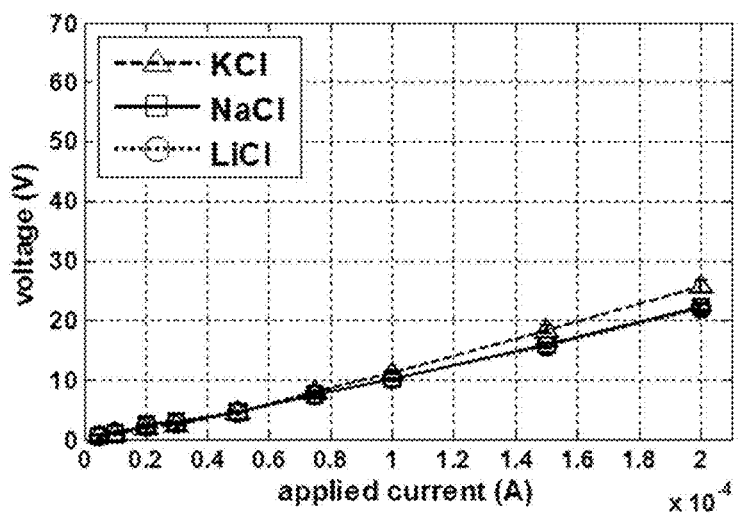
Figure 12D:
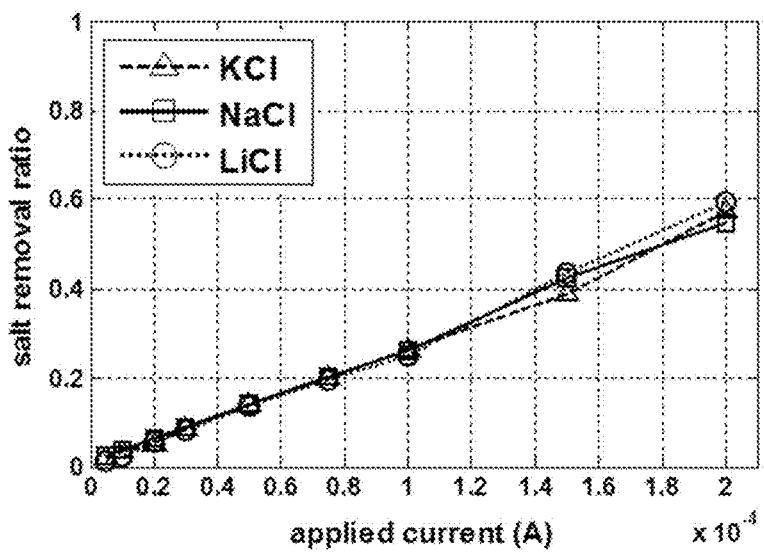
Figure 12E:
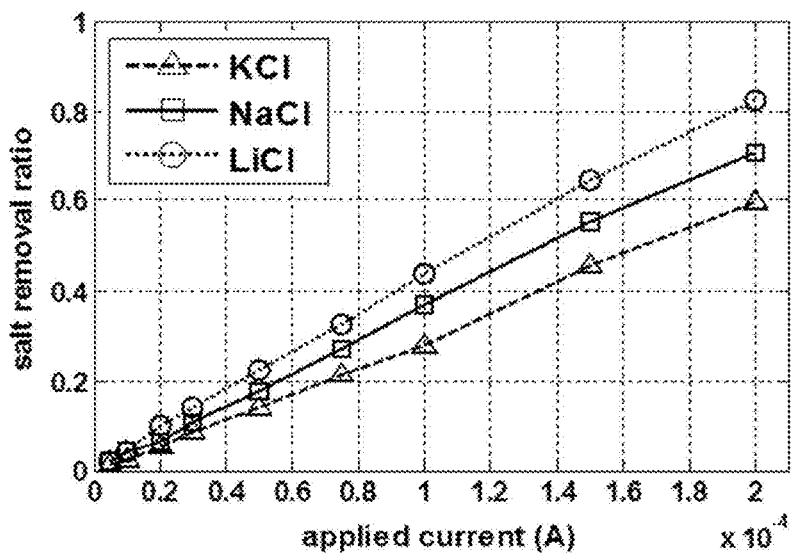
Figure 12F:
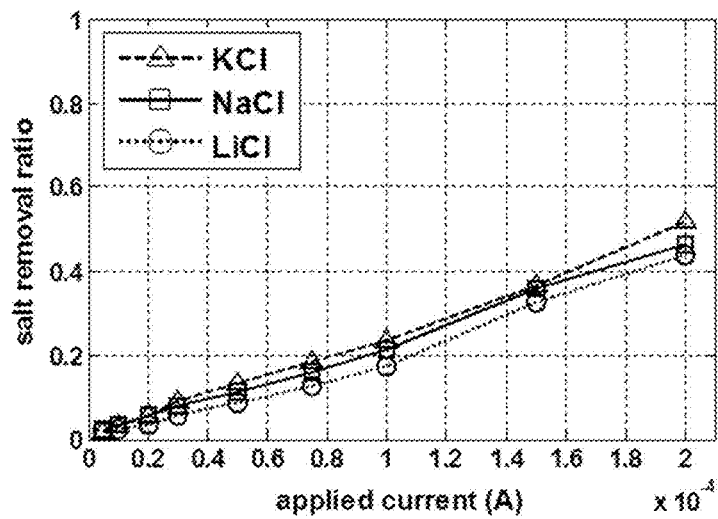

First of all, we measure current responses on applied voltage from 0 to 10 V to overview the ICP and ED systems' characteristics. As can be seen in the figures, the transition from Ohmic to overlimiting regimes are clearly observed with the slope changes near 2V. Interestingly, the current-voltage curves of ED and ICP platform with two CEMs are almost same, but the curves of ICP platform with two AEMs are located above even with the same electrolytes. This indicates two major characteristics of the ICP and ED platforms; the current responses are governed i) by the conducting ions (cations in 2CEM and anions in 2AEM) or ii) by the slower ions (cations in ED). The movement of Cl⁻ always governs ICP platform with two AEMs with KCl, NaCl, and LiCl solutions. The movement of cation governs ICP platform with two CEMs and ED, because chorine ion has a higher molar conductivity than cations here. If we place ions in the order of higher molar conductivity (proportional to electrophoretic mobility or diffusivity), it is Cl⁻>Na⁺>Li⁺. Accordingly, in ICP with 2CEM and ED, the current values with K⁺ are higher than that with Na⁺ and Lit (FIGS. 10A and 10B)

The phenomena by previous linear ICP analysis is that a limiting current density (LCD) is linearly proportional to the diffusivity (or molar conductivity) of conducting ions. Here, the limiting current can be selected at the location where the current-voltage curve is bent. For quantifying desalting performances of two types of ICP platform and ED, we record voltage responses, conductivity drop of desalted flows, and visualized ion concentration/flow profiles with fluorescent dyes during 300 sec at a constant applied current (Ohmic regime: 5, 10 µA and overlimiting regime: 20, 30, 50, 75, 100, 150, 200 µA) and a given flow rates (20 µL/min) of various aqueous solutions with 10 mM KCl, NaCl, and LiCl. Based on the given, controlled, and measured parameters, we also obtain salt removal ratio, energy consumption, energy per ion removal, current efficiency, and area efficiency for all data points. As can be seen, most parameters have similar values in Ohmic regime (5 and 10 µA) with lower current and voltage (<2 V), but there are clear differences in overlimiting regime. This extensive dataset of three different systems with three different electrolytes reveals many interesting trends and elucidates the differences between ICP platform and ED with nonlinear ICP.

First, the voltage-current responses show the similar tendencies. Correspondingly, the energy consumptions of ED and ICP with 2CEM are matched when the same electrolyte is used. In the case of ICP with 2AEM, chlorine ions can move faster with higher molar conductivity, resulting in lower cell resistance, lower voltage responses at a given current, and lower energy consumptions than the other two systems.

However, salt removal ratio of ICP with 2AEM are worse than both ICP with 2CEM and ED; ICP with 2CEM shows larger salt removal ratio than ED, meaning that with the same amount of driving current, ICP (2CEM) can move more ions from the desalted flow output. It is noted that with faster cation (K⁺>Na⁺>Li⁺), the salt removal ratio is constant (ED) or higher (ICP with 2CEM) or lower (ICP with 2AEM). This ambitendency of the salt removal ratio at a constant applied current is also shown in the current efficiency. The current efficiency of ICP with 2CEM (2AEM) always better (worse) than ED, and the trend is magnified the cation molar conductivity is lower. This phenomenon will be discussed in detail in the next section.

Energy per ion removal represents the combined efficiency of both energy consumption and salt removal. Energy per ion removal of ICP with 2AEM have the lowest values, as like energy consumption. However, energy per ion removal of ICP with 2CEM becomes better than that of ED. It is because of higher salt removal ratio of ICP with 2CEM and that of ED, even the energy consumption are the same. In all three systems, removing slow ions (Li⁺) require more energy than the other faster ions (K⁺ and Na⁺). Energy per ion removal in overlimiting regime is $O(10^3 k_B T)$, but it becomes $O(10 k_B T)$ in Ohmic regime, which is comparable with state-of-the-art CDI systems. While the operation in Ohmic regime (applied current <20 µA) shows better energy efficiency (i.e. energy per ion removal), the area efficiency is significantly low. This enlightens us about the trade-off in optimization of desalting processes; better energy per ion removal and worse area efficiency (e.g. CDI or Ohmic ED), or higher salt removal ratio and area efficiency but worse energy per ion removal (e.g. nonlinear ED or ICP). The former is ideal for achieving the maximum energy efficiency, but challenging to deal with large amount of salts (high salinity feed water). The latter can handle high salinity feed water (due to high salt removal ratio) and the system size can be minimized, at the cost of higher energy expense per ions removed.

As discussed above, current—voltage responses in ICP and ED platforms with various salts can be largely expected from the linear and nonlinear ICP model from the previous chapters. However, the trend of the salt removal ratio is exponible for deeper understanding of ion transport in ICP desalination process, along with energy per ion removal and current efficiency.

Figure 15A:
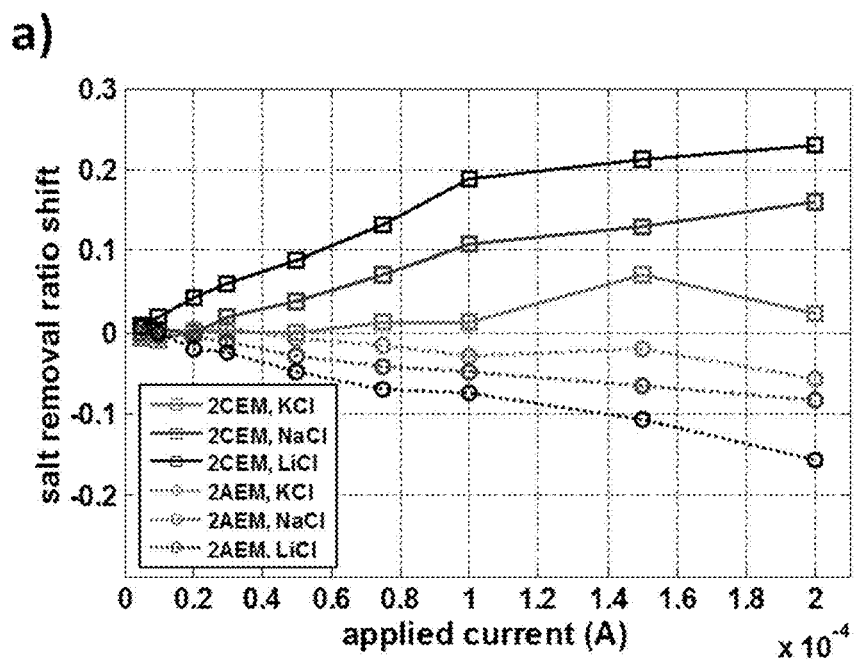
FIG. 15A-B (collectively referred to herein as FIG. 15, views A-B)
Figure 15B:
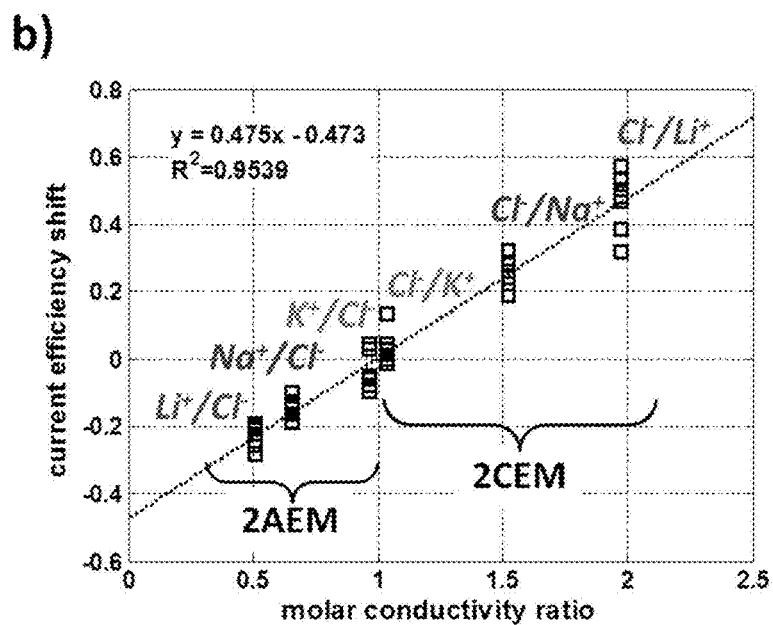
Figure 16A:
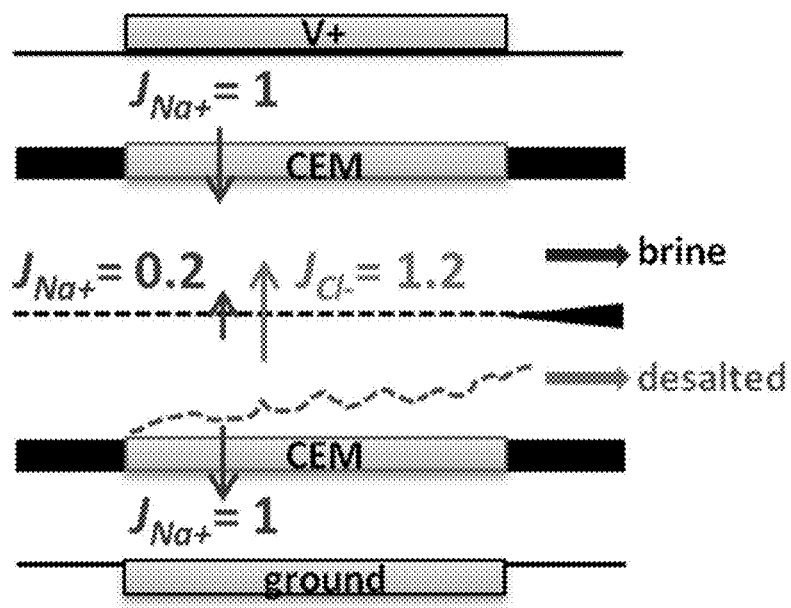
FIGS. 16A and 16B (collectively referred to herein as FIG. 16, views A-B): Mechanism of current efficiency shift. When molar conductivity ratio >1, e.g. NaCl in 2CEM, chlorine ions drag '0.2' sodium ions from desalted flow, resulting 20% enhancement of current efficiency (current is '1'). When molar conductivity ratio <1, e.g. NaCl in 2AEM, chlorine ion holds '0.2' sodium ions in desalted flow, resulting 20% decrease of current efficiency (current is '1').
Figure 16B:
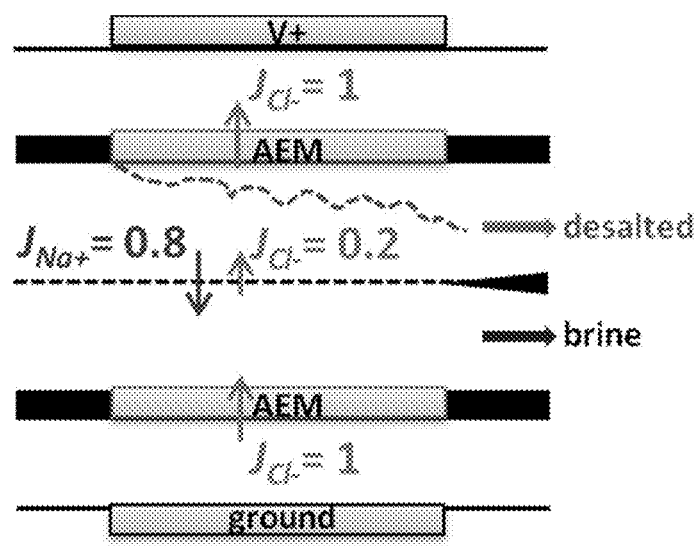

FIG. 15A shows the discrepancy of salt removal ratio between ICP platforms and ED. While there is no discrepancy in the Ohmic regime (<20 µA), the salt removal ratio shifts up (down) for ICP platforms with two CEMs (AEMs), as the molar conductivity of cation is lowered. In fact, current efficiency can be larger than 1 for the ICP with two CEMs. One possible explanation of this rather surprising result is cation-anion interaction (co-location) enabled by strong electric field and EC generated in the system to return to electroneutrality. When an electric field is applied, conducting ions (cation on CEMs and anion on AEMs) and relocating (non-conducting) ions (anion on CEMs and cation on AEMs) move towards the opposite directions, with non-conducting ions eventually blocked by the membrane and forming the enrichment zone. Especially at the anodic (cathodic) side of CEMs (AEMs), the conducting-relocating ion pairs have to be separated strongly to develop extended space charge layers (ESC), but only near the membrane surface. In the bulk solution, however, electroneutrality condition will be maintained, and the faster ion drags the slower ion toward the direction of the faster ion movement (FIGS. 16A and 16B). Then, the amount of rejected ions in desalted flow (or ion depletion zone) increases if the relocating (non-conducting) ion is faster (higher electrophoretic mobility/molar conductivity). If the conducting ion is faster, it drags the relocating ions to suppress depletion zone and decreases salt removal ratio. While this phenomenon happens on CEMs and AEMs in ED, the enhancement and suppression occurs on the different IEMs at the same time, canceling this effect. To check this hypothesis, we draw the discrepancy of current efficiency between ICP platforms and ED according to the molar conductivity ratio, which is given by:

$$\text{Molar conductivity ratio} = \frac{\Lambda_i \text{ of relocating ion}}{\Lambda_i \text{ of conducting ion}}. \qquad (1.7)$$

The current efficiency shift of ICP platform from ED shows strong dependency on molar conductivity ratio, which supports our hypothesis.

Figure 17:
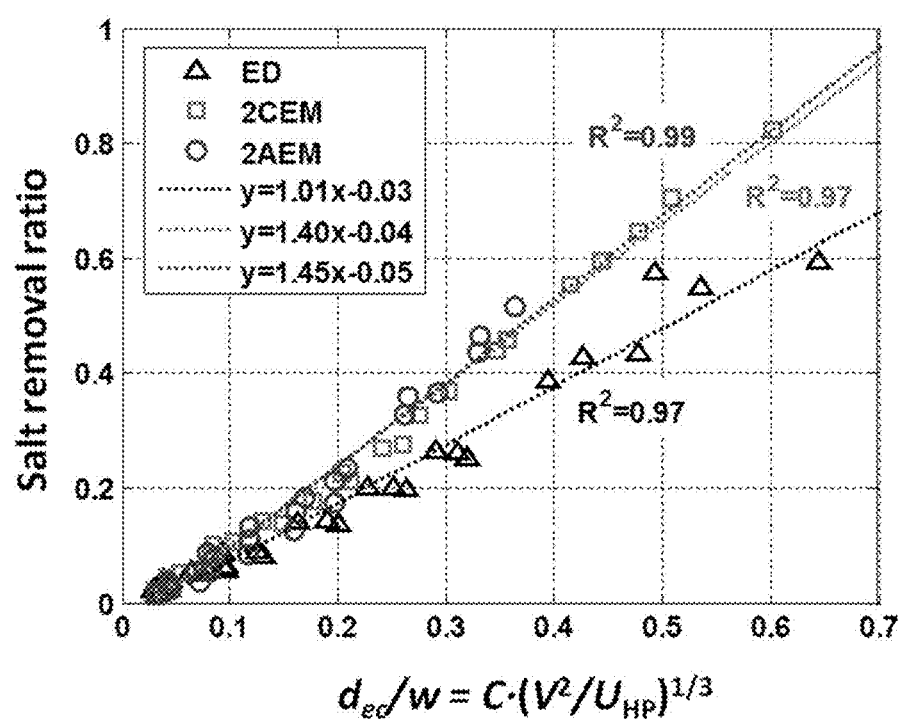
FIG. 17. Salt removal ratio according to the height of sheared EC. The height is calculated with the scaling law.

With the scaling law for the height of sheared EC, salt removal ratio in overlimiting regime can be predicted. Because the most ions are rejected or relocated from the depletion zone (or EC zone), the height of EC represents the degree of salt removal occurring in the system. FIG. 17 shows the salt removal ratio of two ICP platforms with CEMs and AEMs, and ED. As can be seen, all data points in overlimiting regime obtained with two ICP platforms (and three different kinds of electrolytes) and ED are collapsed onto the two separate linear lines (one for ICP, another for ED). The scaling constant C for all cases is $3.93 \times 10^{-3}$. There are two notable points i) trend is consistent regardless of the electrolyte species or molar conductivity ratio and ii) steeper slope of ICP platforms than that of ED. The resulting salt removal ratio of ED is well fitted to the slope of 1. Interestingly, however, the slope becomes higher about 1.4 times for ICP techniques (both for 2AEM and 2CEM cases). This indicates that the more ions can be removed at a given geometry, electric potential, and flow velocity by using ICP platform, compared with ED. This advantage of ICP platform from ED is presumably coming from opening the system by using only one type of IEMs for free conduction of cation or anion. Yet, further theoretical modeling and study would be required to fully understand and utilize this.

In one embodiment, an ion exchange resin, e.g., in a bead form, can be added to the channel, e.g., in the path of the desalted flow stream. In a continuous electrodeionization (CEDI) process, IERs can enhance ion transfer toward the IEMs, particularly where the IER is more conductive than the electrolyte or aqueous stream to be purified. In addition, generation of hydrogen ($H^+$) and hydroxide ($OH^-$) ions by water splitting help IER's regeneration (i.e. the procedure for recovering the ion exchange capacity of IER), so CEDI can remove even weakly ionized species such as carbonic acid; this phenomenon is called electroregeneration. Enhanced ion transfer and electroregeneration by IER allows CEDI to produce ultrapure water.

Figure 1A:
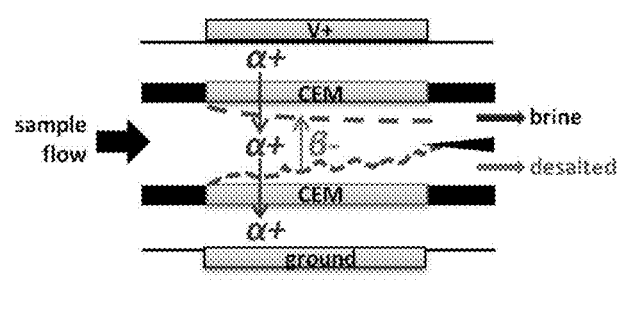
FIGS. 1A, 1B and 1C (collectively referred to herein as FIG. 1, views A, B and C) schematic figures of desalination/purification strategy utilizing ion concentration polarization (ICP) between two identical ion exchange membranes (IEMs). Two electrodes and two CEMs (or AEMs) are juxtaposed, and the channel between the two CEMs (or AEMs) is bifurcated at the end of the membranes. Blue and red arrows indicate the movement of cations $α^+$ and anions $β^-$. Ion depletion zone $d_{de}$ with low ion concentration occurs at the anodic side of CEMs and at the cathodic side of AEMs (meandering dotted lines in FIGS. 1A and C). Electroconvective vortices exist in this depletion zone (solid black circles). Ion enrichment zone $d_{en}$ with high ion concentration occur at the other side of CEMs and AEMs (curvy dotted lines). ED is compared in FIG. 1C.
Figure 1A:
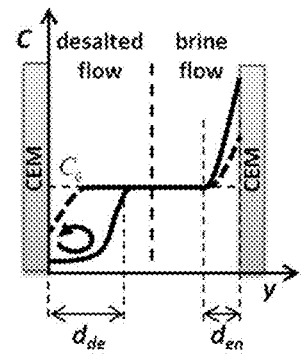
Figure 1B:
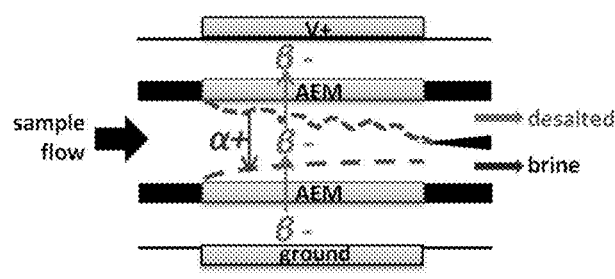
Figure 1B:
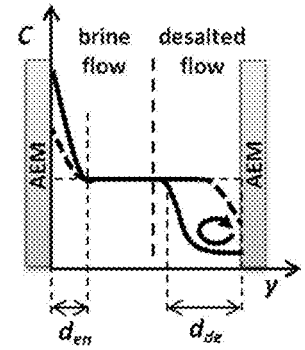
Figure 1C:
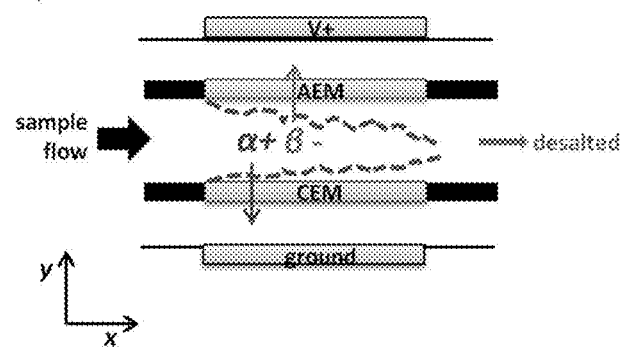
Figure 1C:
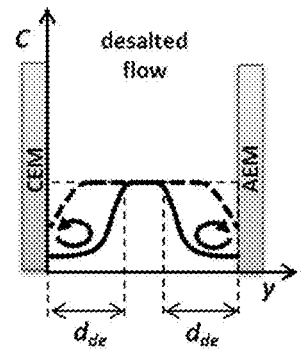
Figure 13A:
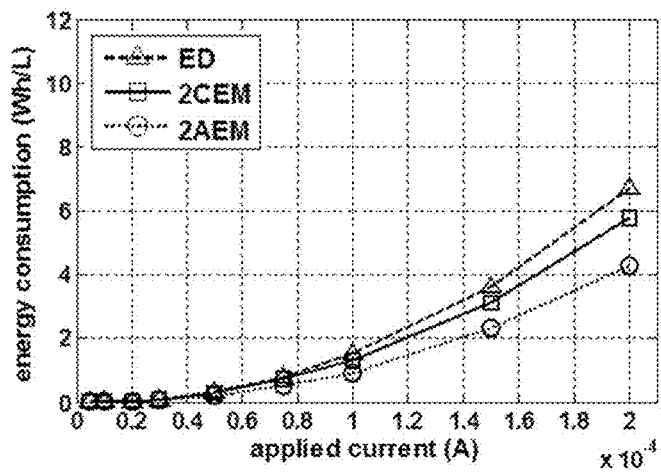
FIG. 13A-L (collectively referred to herein as FIG. 13, views A-L FIG. 13A-13C: Energy consumption, FIG. 13D-13F: Energy per ion removal, FIG. 13G-13I: Current efficiency, and FIG. 13J-13L: Area efficiency of two types of ICP platform and ED, according to the electrolytes, KCl (FIGS. 13A, 13D, 13G and 13J), NaCl (FIGS. 13B, 13E, 13H and 13F), and LiCl (FIGS. 13C, 13F, 13I and 13L). Three metrics are calculated as described herein. 2CEM and 2AEM indicate ICP platforms with two CEMs and AEMs, respectively.
Figure 13B:
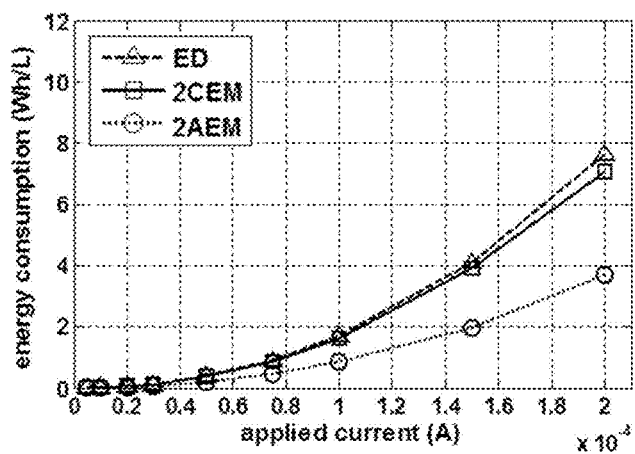
Figure 13C:
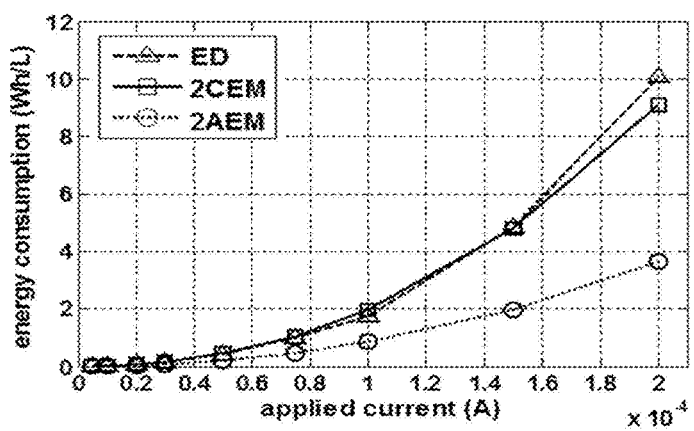
Figure 13D:
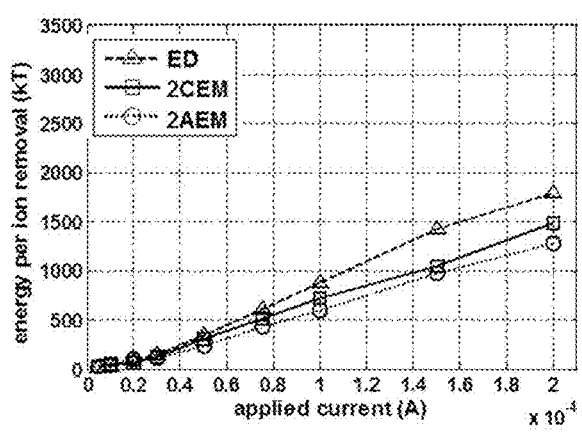
Figure 13E:
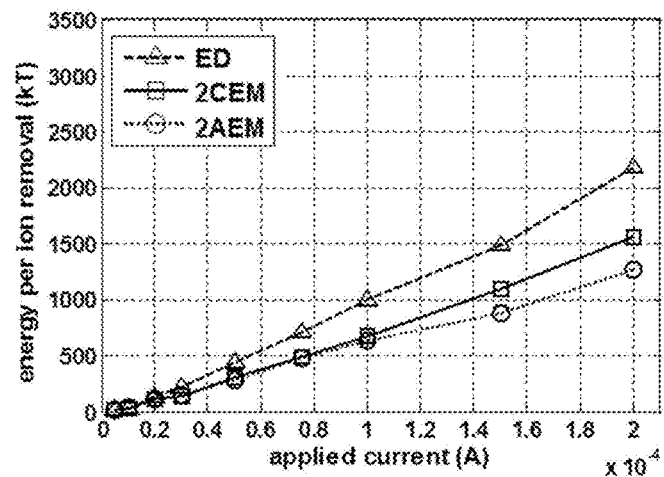
Figure 13F:
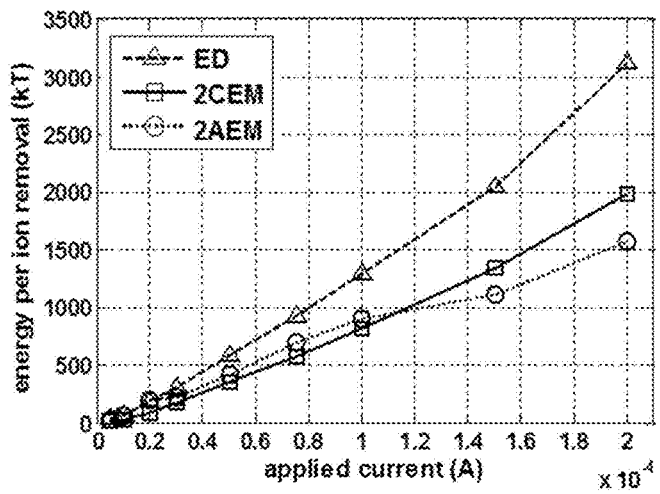
Figure 13G:
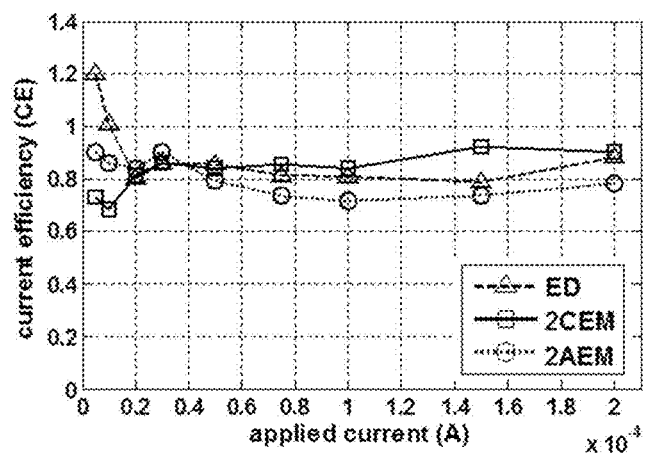
Figure 13H:
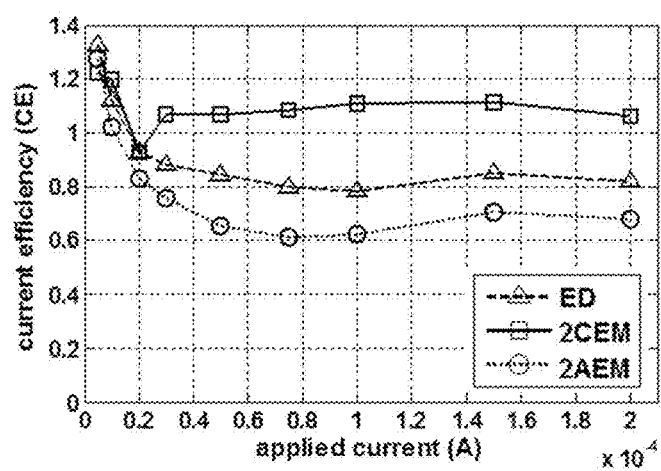
Figure 13I:
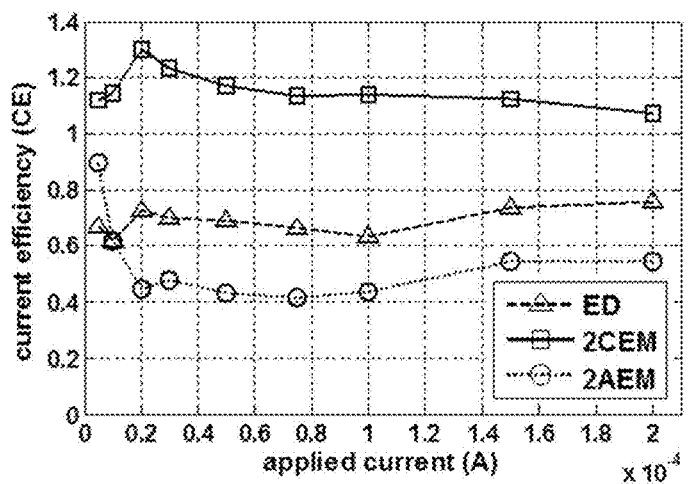
Figure 13J:
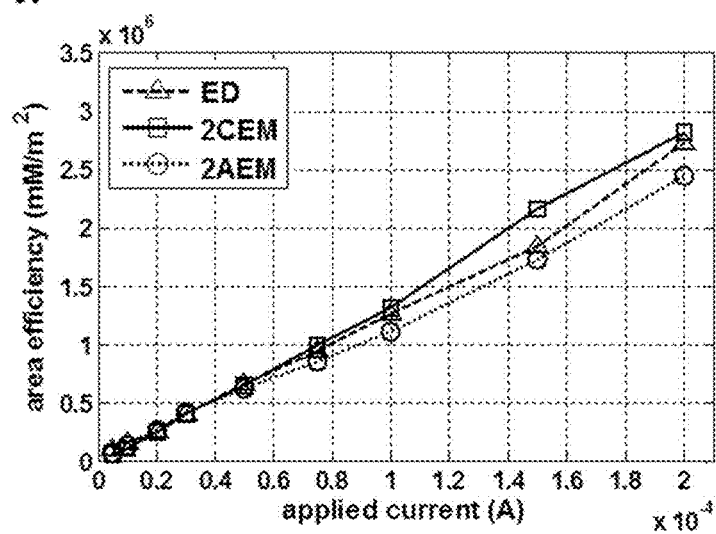
Figure 13K:
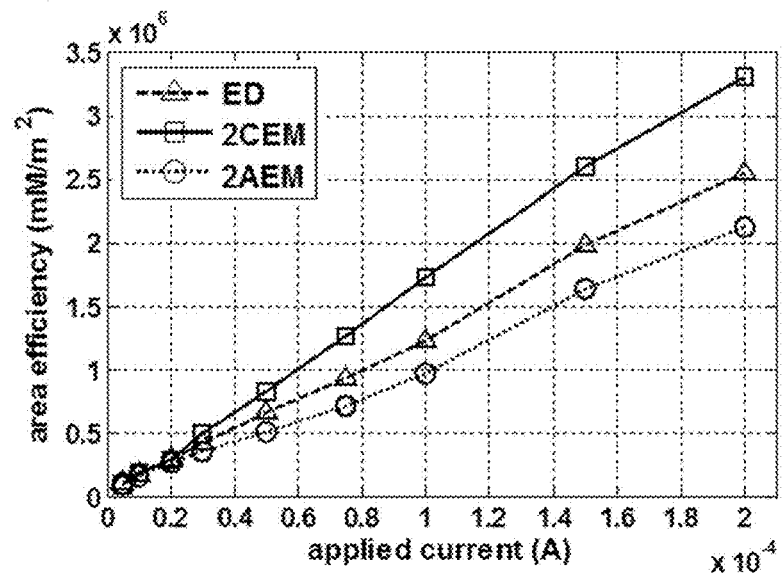
Figure 13L:
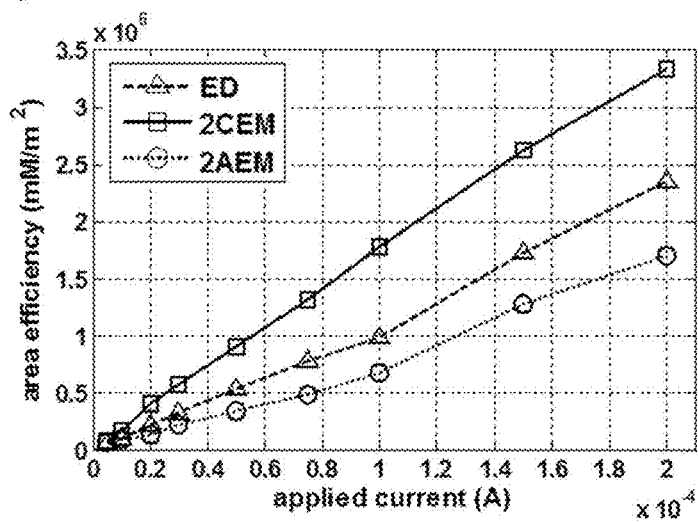
Figure 14A:
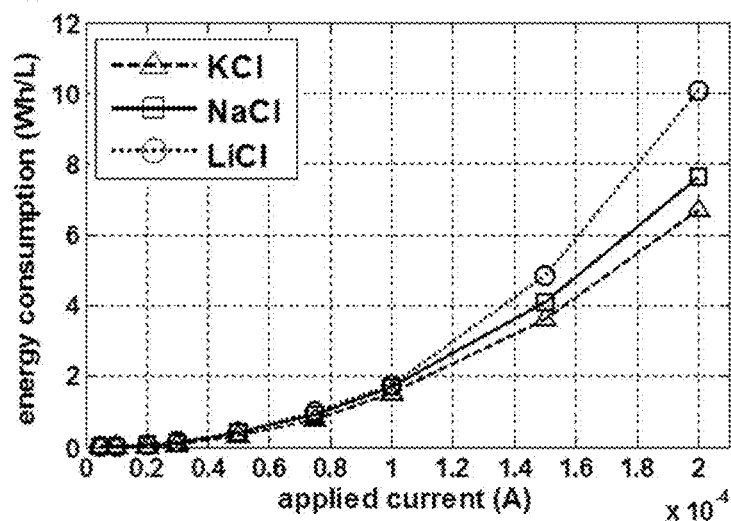
FIG. 14A-L (collectively referred to herein as FIG. 14, views A-L)
Figure 14B:
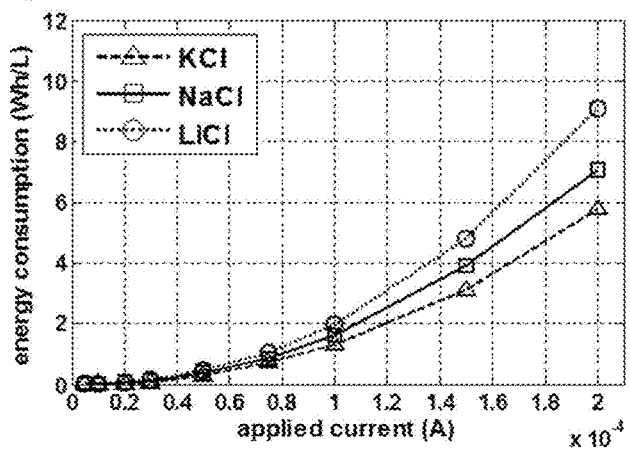
Figure 14C:
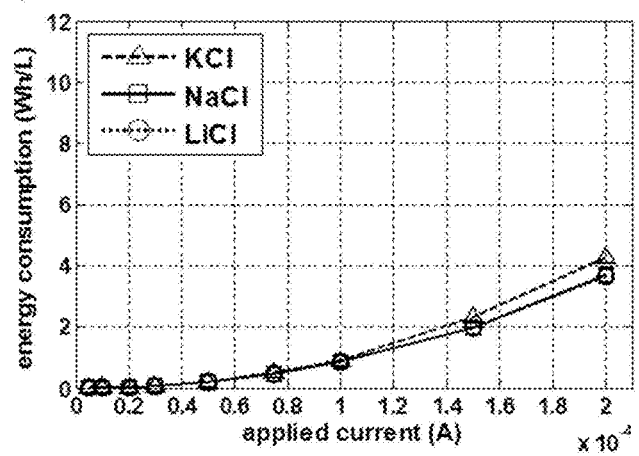
Figure 14D:
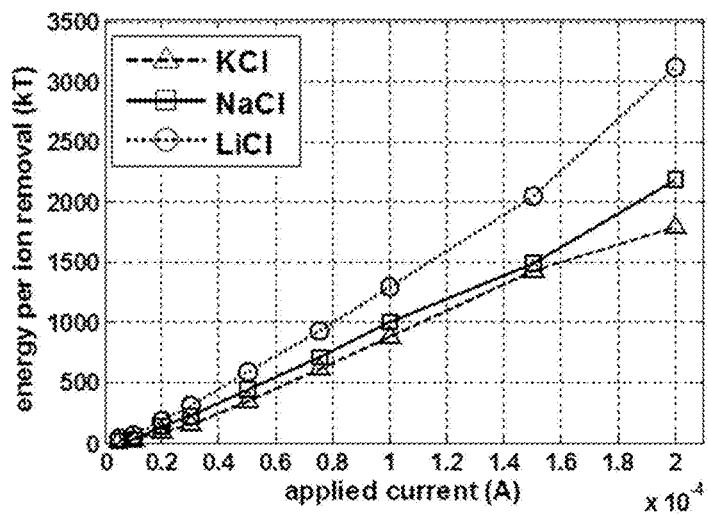
Figure 14E:
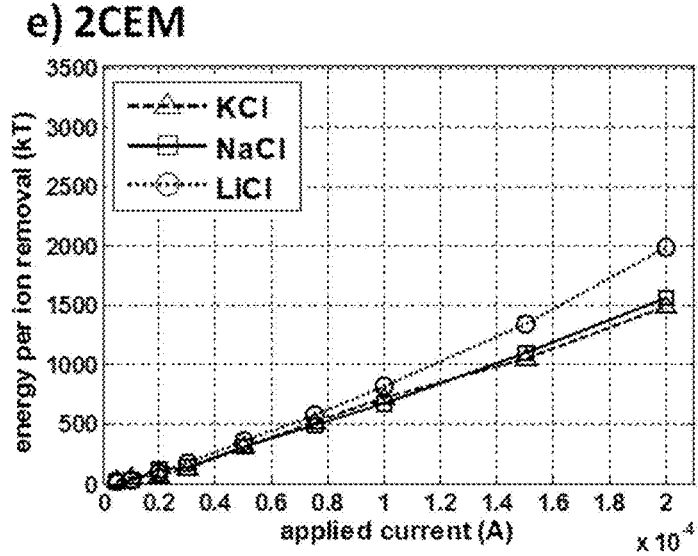
Figure 14F:
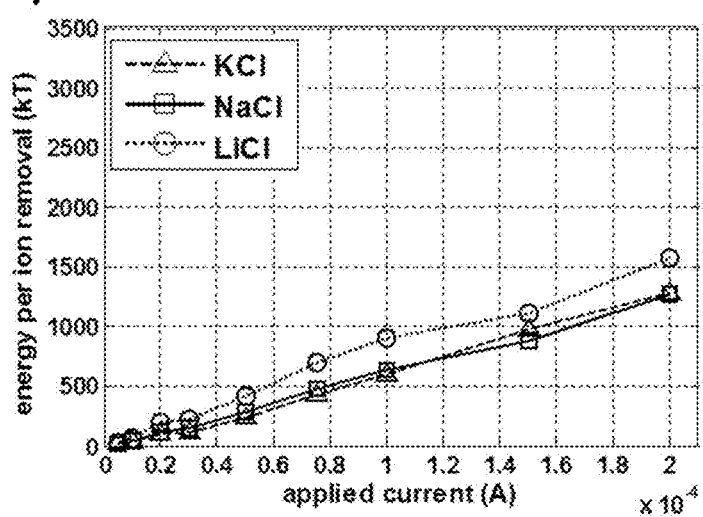
Figure 14G:
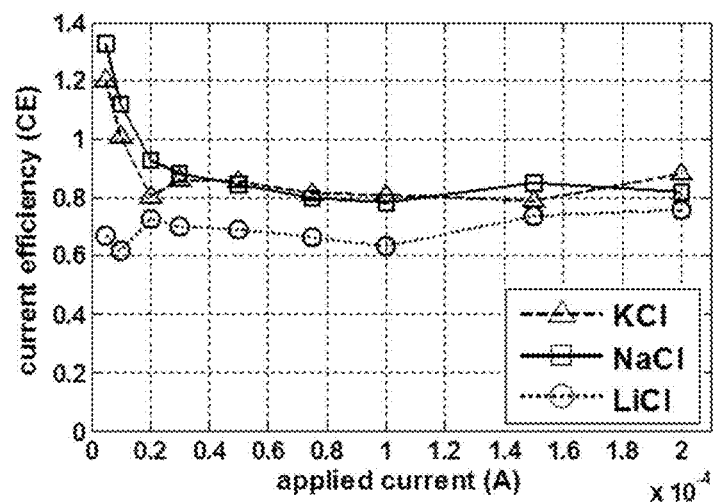
Figure 14H:
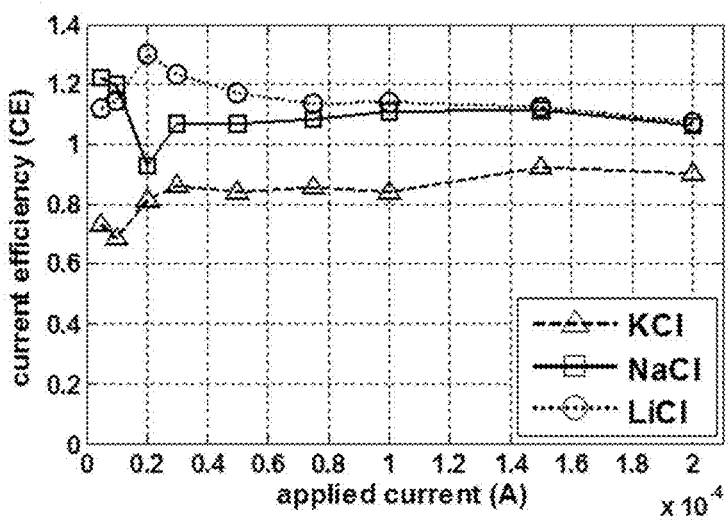
Figure 14I:
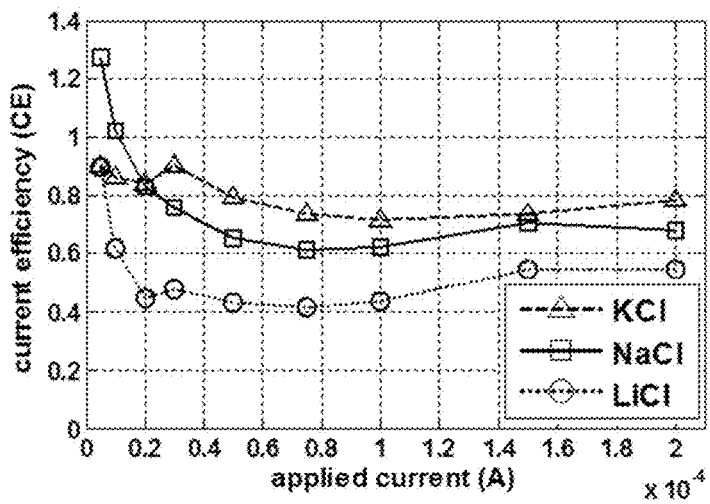
Figure 14J:
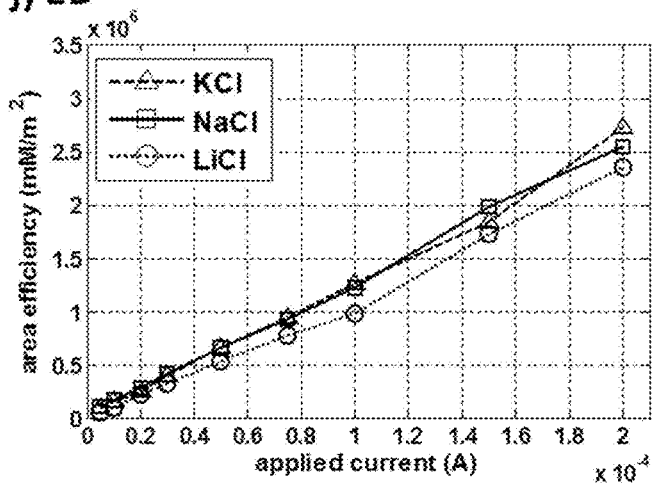
Figure 14K:
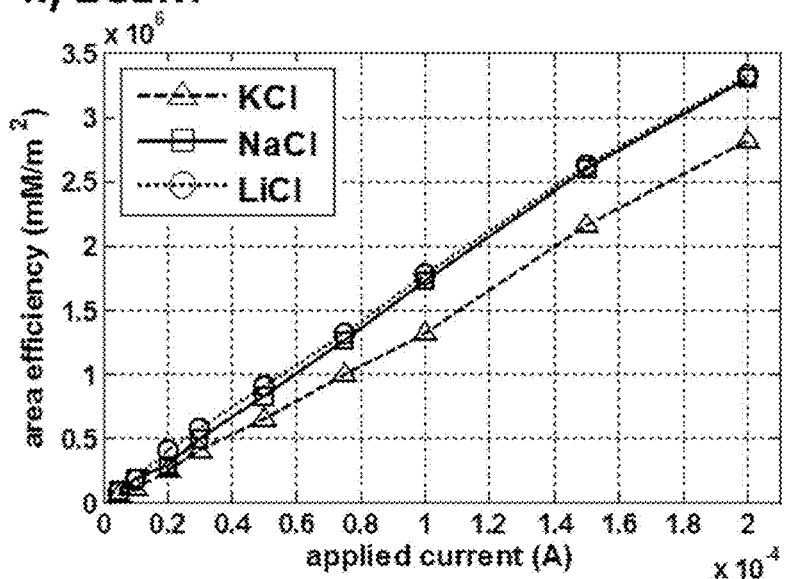
Figure 14L:
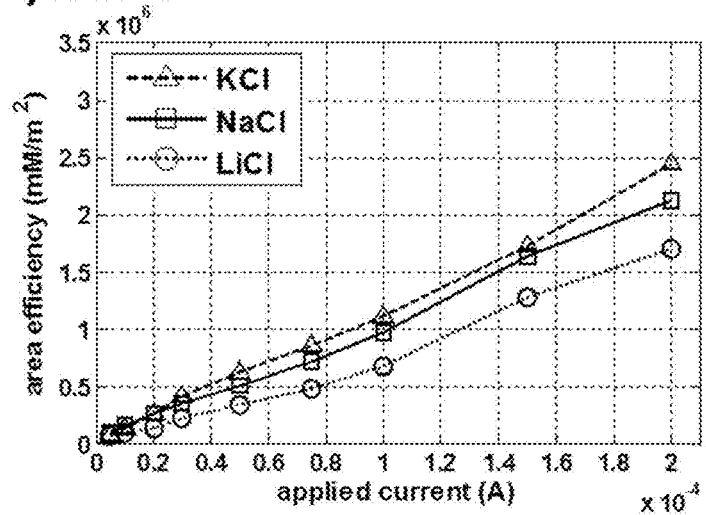
Figure 18A:
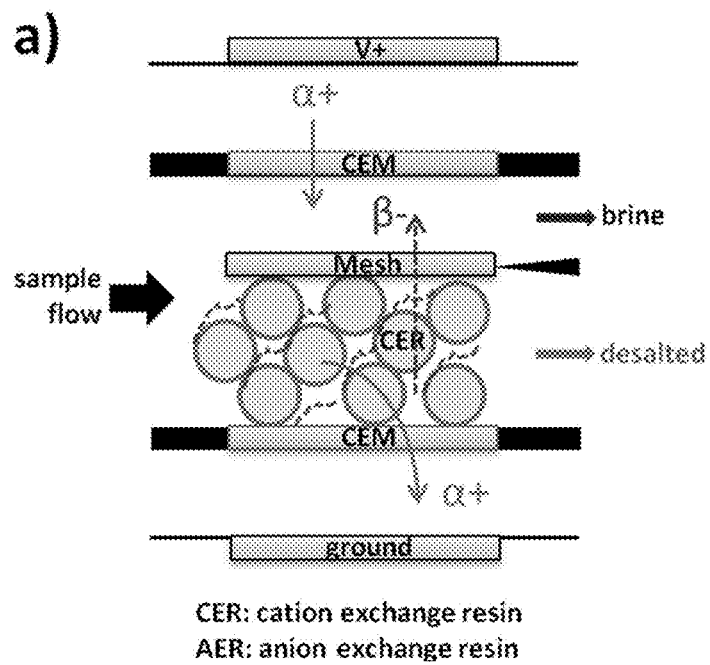
FIG. 18A-B (collectively referred to herein as FIG. 18, views A-B: Ion exchange resin (IER)-embedded ICP desalination platform with two cation exchange membranes (CEMs) a) cation exchange resins (CERs) are filled between the lower CEM and the integrated mesh to enhance the conduction of cation ($\alpha^+$) and split the depletion zones. b) the mixture of CERs and anion exchange resins (AERs) are filled to enhance the conduction of both cation ($\alpha^+$) and anion ($\beta^-$) and split the depletion zones. Cation $\alpha^+$ (anion $\beta^-$) prefer to transfer through CERs (AERs) than the electrolytes (solid lines). Anion $\beta^-$ transfer through the electrolyte without AERs (dotted line).
Figure 18B:
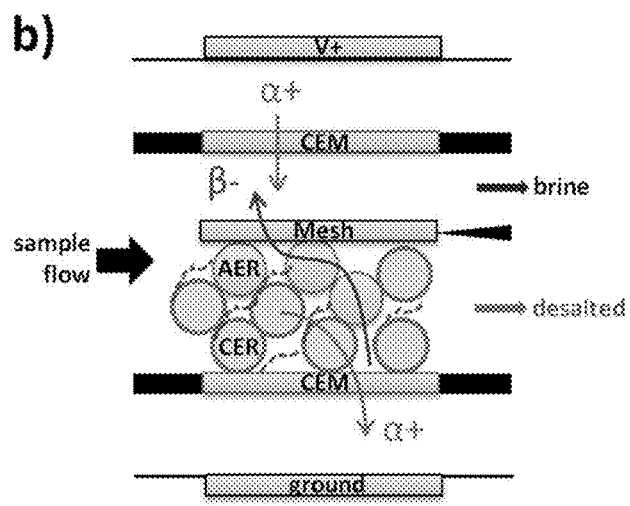

FIGS. 18A and 18B IER-embedded ICP desalination platform with two CEMs. Between the CEMs, a mesh is inserted to separate the regions of desalted and brine flows, and act as a container for IERs. Here, we add cation exchange resins (CERs) or both CERs and anion exchange resins (AERs) in the desalted flow region for two purposes. First, the system's resistance decreases for both conducting ions (e.g., the cation by CERs) and relocating ions (the anion by AERs), which is the same function of IERs in CEDI. Second, we can generate small depletion zones on CERs (green wavy lines in FIG. 18B), instead of one large depletion zone on the lower CEM (FIG. 1A). Fractionizing depletion zones by CERs minimizes the instability of electroconvection (EC), enhancing energy efficiency to remove ions; energy per ion removal is worsen when the depletion zone is expanded at higher voltage or current (FIG. 13D-13F). It is noted that the fractionizing strategy can be applied for produced water desalination, which have a harsh condition (high salinity of sample waters) to generate ICP strongly.

Bio-agents in nature are generally negatively charged (e.g. *Escherichia coli*, *Salmonella*, and *Pseudomonas*). To demonstrate the rejection of these bio-agents, we use negatively charged fluorescent dye and particle: Alexa Fluor 488 and 6 μm carboxylate microspheres (Polyscience, Inc, Warrington, Pa.). As ICP is generated under an electric field, most dyes and particles in the desalted flow (lower channel in FIG. 5A) moves upward to the brine flow (upper channel in FIG. 5A). This shift occurs immediately after voltage or current is applied, and the ion/dye/particle-free flow is produced.

Figure 6A:
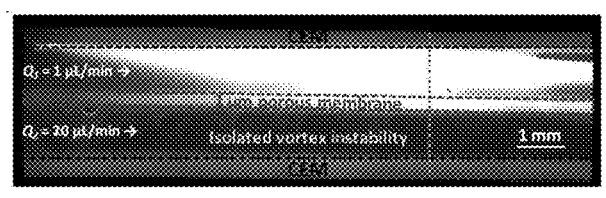
FIG. 6A-B (collectively referred to herein as FIG. 6, views A-B): Schematic image of the time-economical massive preconcentrator. The microporous membrane (e.g. 1 μm porous membrane) is located parallel between two CEMs. Vortex instability by ICP is isolated in the lower channel by the porous membrane, and bio-agents (dot) move upward through the membrane.

The key concept to use the described purification/desalination system as a preconcentrator is fluidic isolation of two desalted and brine channels (2 and 3 in FIG. 2). The inserted microporous membrane between two CEMs separate the desalted and brine channels (FIG. 6A). The pore size of the inserted membrane is large enough to allow target bio-agent transport, but it is small enough to prevent fluidic momentum transfer; hydrodynamic resistance through the microporous membrane is much higher than that of the channels, so electroconvective vortices by ICP is confined only in the desalted channel (FIG. 6A).

Figure 6B:
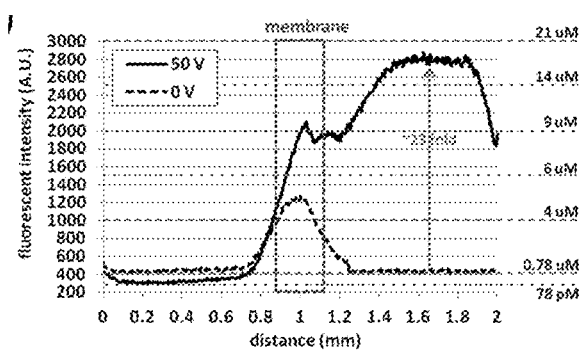

With the ideal case assumption that no charged bio-agents can penetrate the ion depletion zone (line in FIG. 6B), and the agents will move to the brine channel, generating preconcentrated flow (arrow in FIG. 6B). In this scenario, the concentration factor r can be controlled by adjusting the ratio of flow rates of two desalted/brine channels, $r=Q_2/Q_1$.

Figure 7A:
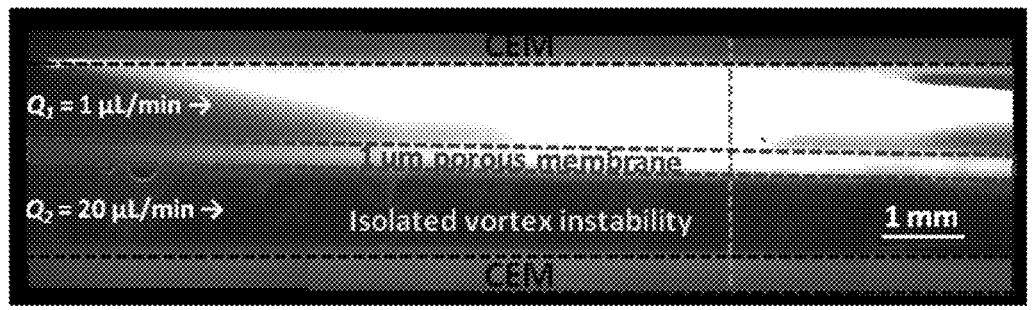
FIG. 7A-B (collectively referred to herein as FIG. 7, views A-B): Demonstration of 20 fold preconcentration of Alexa Fluor 488.
Figure 7B:
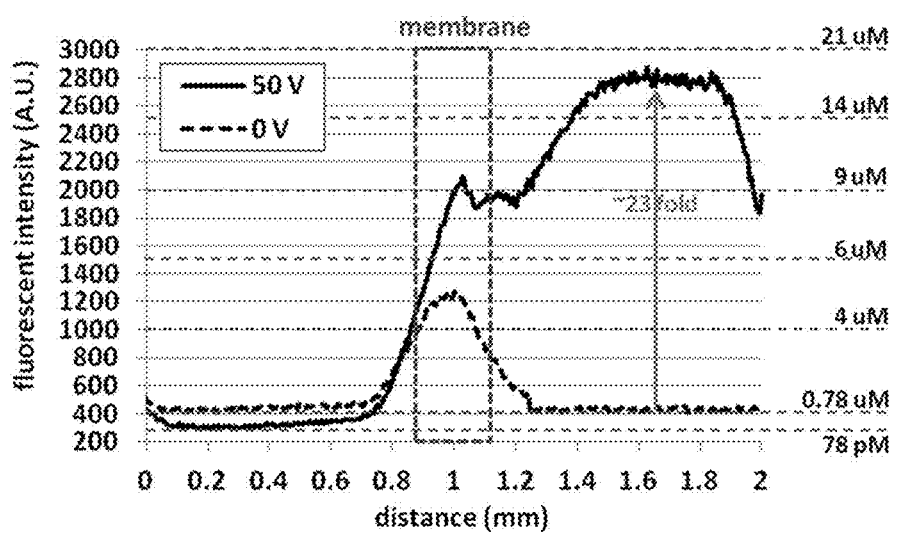
Figure 8A:
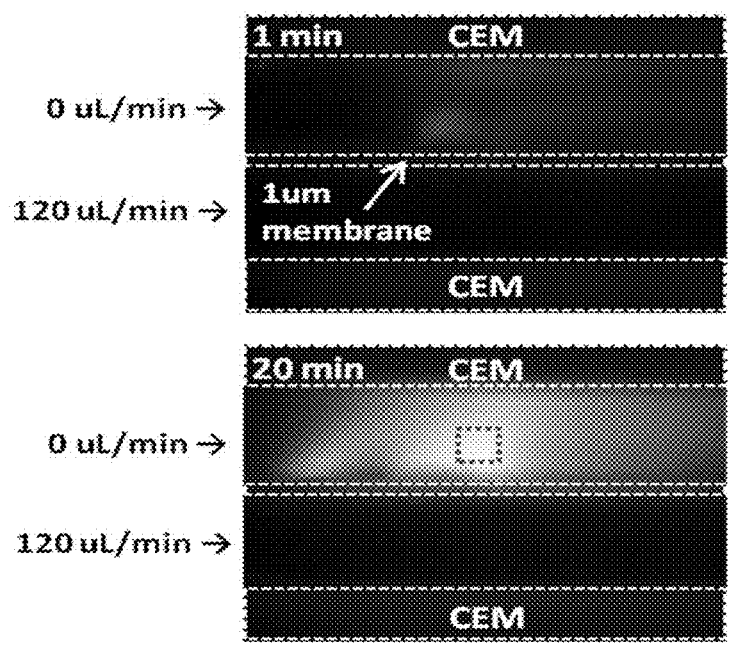
FIG. 8A-C (collectively referred to herein as FIG. 8 views A-C): Time response of the preconcentration system.

To validate the preconcentration performance, we quantify the dye concentration in the system. 0.78 μM Alexa Fluor 488 in 10 mM NaCl solution flows continuously (FIG. 7A). Polycarbonate membrane with 1 μm pores (Sterlitech Co., Kent, Wash.) is inserted between two CEMs. In FIG. 8A, strong electroconvective vortex and ion depletion zone under 50 V are confined in the desalted (lower) channel. Mismatched flow rates in two channels ($Q_1$ and $Q_2$) result in strong preconcentration of dyes in the preconcentrated (upper) channel. It is noted that the experimental preconcentration factor (~23 fold) is well matched with the calculated factor ($r=Q_2/Q_1=20$) (FIG. 7B).

Figure 8B:
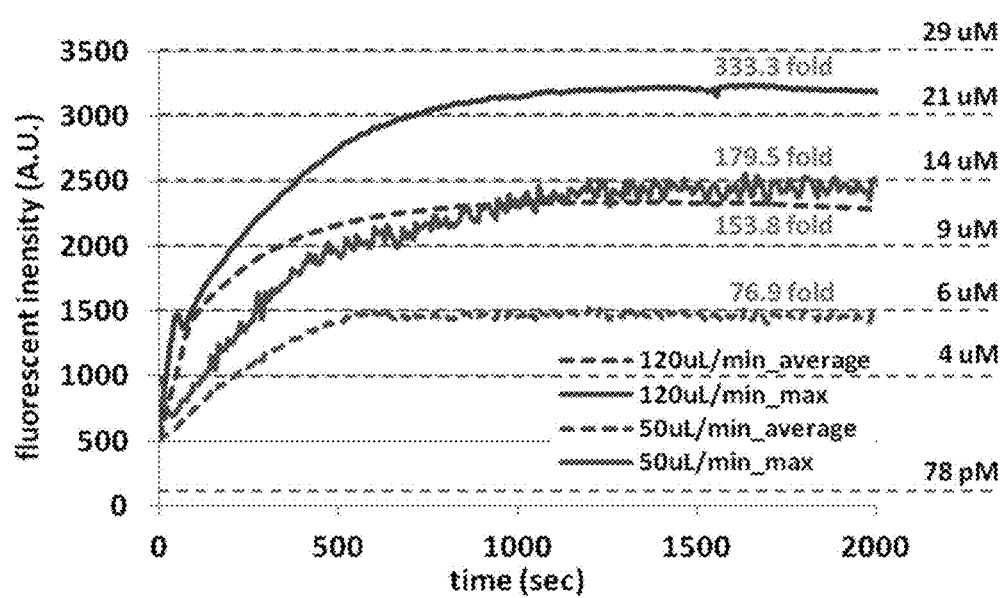
Figure 8C:
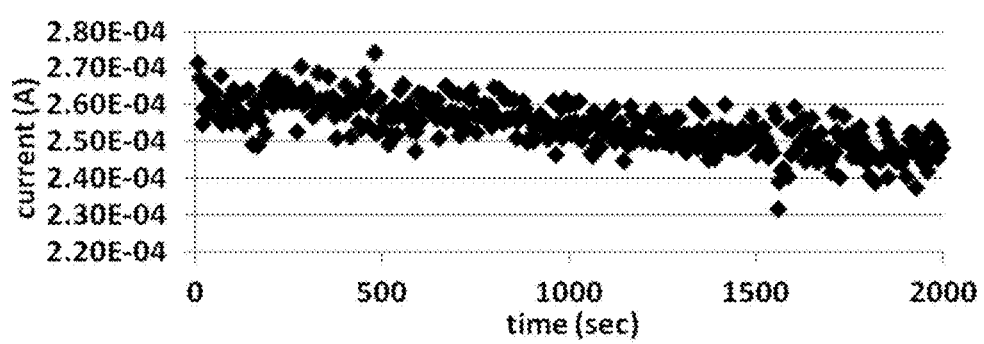

To increase higher concentration factor and high sample throughput, we demonstrate the preconcentration of 78 pM Alexa Fluor 488 in 1 mM NaCl with higher flow rate ratio ($Q_2$=50 or 120 μL/min and $Q_1$~0). The preconcentrated dyes would be diffused out of the preconcentrated channel because the flow rate is nearly zero. Fluorescent intensity in the preconcentrated flow and current response are recorded in 2000 sec. As can be seen in FIG. 8A-8C, dyes are highly preconcentrated up to 333 fold (locally). The concentration of preconcentrated dye and current response (under 110 V) are saturated and maintained, indicating stable and steady operation (FIGS. 8B and 8C).

The method of the invention can be used to detect molecules. Microfluidic devices for molecular detection have been extensively pursued, due to many well-documented advantages of such systems; rapid analyses, less consumption of samples and reagents, and potential for massive parallelization and automation. However, efficient world-to-chip interfacing, sample preparation and concentration of low-abundance analytes remain as challenges, especially for non-nucleotide targets. To achieve more sensitive detection for any given sensor platform, various sample preconcentration approaches have been developed, including isotachophoresis, electrokinetic trapping, membrane filtration, and ion concentration polarization. These methods could potentially enhance the sensitivity of biological assays such as immunoassays and enzyme activity assays. So far, most existing biomolecule concentration devices operate by collecting or trapping low-abundance biomolecules within a small volume sample plug. While this mode of concentration is efficient in increasing the local concentration, it is often limited in maximum flow rate/sample volume one can process, and the integration with downstream detection steps is commonly challenging. One could avoid these problems by carrying out the detection within the plug during the ongoing concentration process, but different electric/fluidic/pH/other conditions within (or near) the concentrated plug could render such in situ detection less desirable. Otherwise, cells could be concentrated by inertia force-based microfluidic device, but they are not suitable for biomolecule concentrator because the size of molecules is too small to expect inertial effect.

The present invention offers a continuous flow device to produce a concentrated stream containing a molecule to be tested. The test molecule can be detected by methods generally known in the art.

Figure 9:
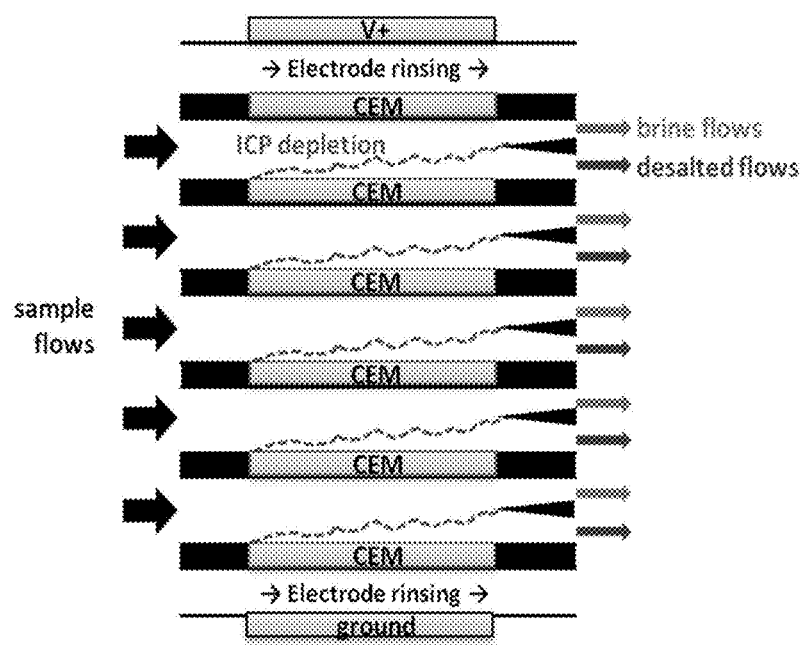
FIG. 9 Schematic diagram of the stacked platform (5 cells) to achieve high flow rates. Green dotted lines indicate the ion depletion zones to reject ions and bio-agents. Sample flows (black thick arrows) are separated into fresh desalted/filtered flows and preconcentrated/brine flows by ICP. Electrode rinsing solution is circulated between the CEM and electrodes.

While scale-up is one of the biggest hurdles of the various microfluidic platform for commercialization, the demonstrated technology here can be scaled-up very easily. We can stack the unit system to achieve high flow rates (FIG. 9). It is possible because the invented platform here has a symmetrical and reciprocal design, like electrodialysis (ED) system. In fact, one can potentially use the existing ED platform and modify it into ICP desalination system, by simply removing all the AEMs yet keeping all the fluid routing. Therefore, this will make the technology quite attractive to companies already manufacturing ED systems at various scales. We expect that the power efficiency of the system will be comparable to that of ED technology. We also note that the demonstrated sample device has a shallow depth, 0.2 mm, which treats up to 120 µL/min samples. Therefore, for example, if we modify a commercial handheld ED system (25 cell pairs, active membrane area: 64 $cm^2$, intermembrane distance: 1 mm, and the total device dimensions 165×150×190 $mm^3$ (weight: 3 kg)) (ED64004, PCCell GmbH, Germany), we can deal with sample waters up to 1152 L in 1 hour.

The technique described here was demonstrated in the desalination/purification of brackish water and the preconcentration of dyes in fresh/brackish water (1 and 10 mM NaCl solution), but the basic idea behind the technology can be applied to other conditions and targets, including seawater/produced water desalination and bacteria preconcentration for water monitoring. There is a very substantial commercial opportunity for developing efficacious water desalination/purification/monitoring processes for the following reasons.

First, reverse osmosis (RO) is currently the dominating technology in non-thermal desalination market. However, electrochemical desalination methods (e.g. electrodialysis and capacitive deionization) start to receive attention because of several important advantages, such as high water purity and scalability[4]. The invention disclosed here can provide two critical merits of the electrochemical desalination methods: single-step purification and high area efficiency by utilizing the nonlinear ICP.

Second, preconcentration/enrichment process is valuable to analytical chemistry field to detect low concentration targets, such as detrimental toxins and bacteria in recreational and drinkable waters[7]. Therefore, various methods to concentrate targets have been developed from centrifuge (in laboratory scale) to electrokinetic trapping (in microscale). While these existing methods are accurate and specific, there are critical limitations. In the case of laboratory scale preconcentrators (e.g. centrifuge and evaporation), they need relatively long operation time (few hours to days). In contrast, preconcentration process built in microfluidic systems (e.g. electrokinetic trapping and isotachophoresis) have short time scale, but; extremely low sample volume throughput (pL~uL per 1 hour). Then, if the target is quantized and have extremely low sample concentration, the microsystem's reliability would be low. The preconcentration technology described here can potentially produce large volume of preconcentrated targets in 1 hour.

Figure 19A:
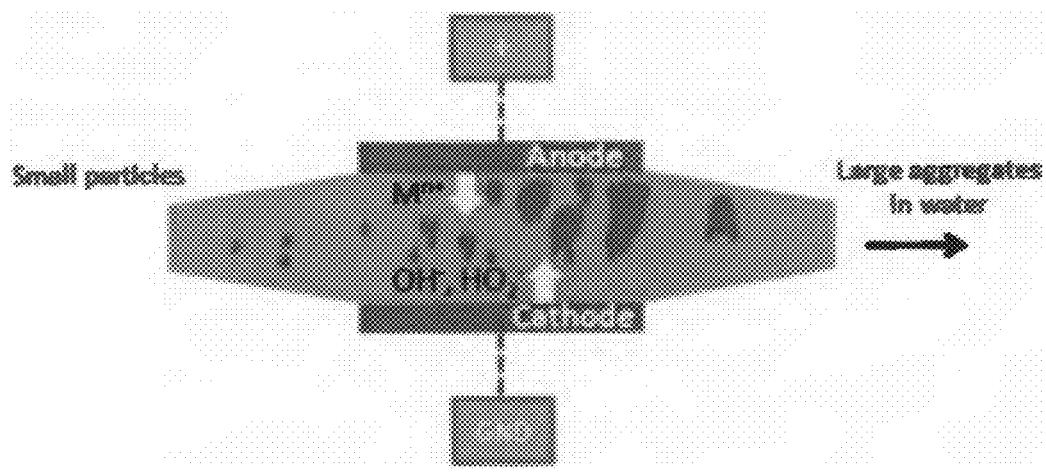
FIGS. 19A, 19B and 19C. Schematic of electrocoagulation (EC); schematic of hybrid ICP-EC system; photo experimental setup; respectively.
Figure 19B:
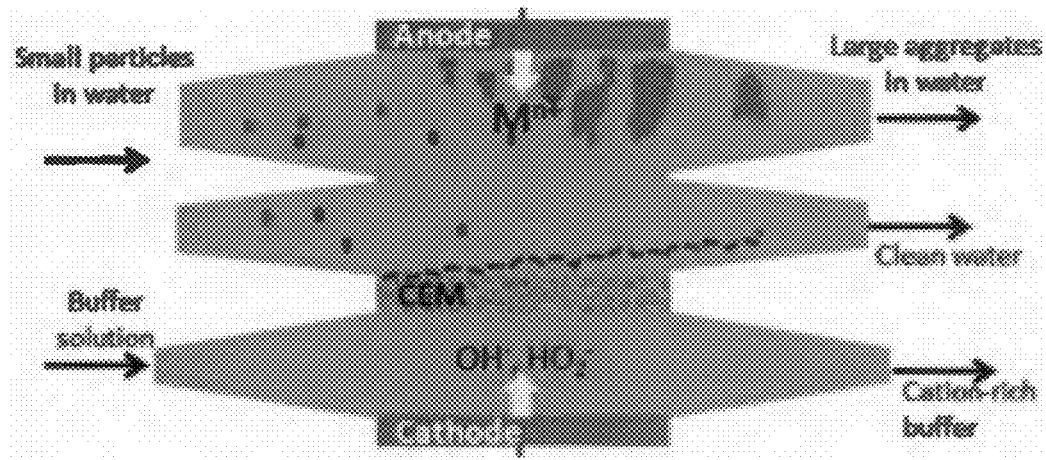

Another embodiment of the invention, a hybrid ICP-EC method of water treatment, is shown in FIG. 19B. It further comprises the step of electrocoagulation which occurs simultaneously with the ICP step. For comparison, an existing standalone EC process is shown in FIG. 19A. The anode used to create the electrical field comprises a sacrificial metal and is used to provide metal ions for electrocoagulation. In this embodiment, a first water stream is directed into at least a first channel. The at least a first channel comprises at least one sacrificial anode, at least one ground, at least one ion exchange membrane, at least one sample inlet, at least one anode outlet, at least one desalted outlet, and at least one buffer outlet. An electric field is applied across the first water stream, whereby electrocoagulation occurs near the at least one sacrificial anode. Ions pass through the ion exchange membrane and form an ion depletion zone which comprises a purified water stream. An ion enrichment zone is formed which comprises a concentrated ion aqueous stream. The coagulant-rich stream is collected at the at least one anode outlet and/or the purified water stream is collected at the at least one desalted outlet and/or the concentrated ion aqueous stream is collected at the at least one buffer outlet.

In a preferred embodiment and as shown in FIG. 19B, the ion exchange membrane is cationic.

In another preferred embodiment, the sacrificial anode comprises aluminum or iron.

Figure 20:
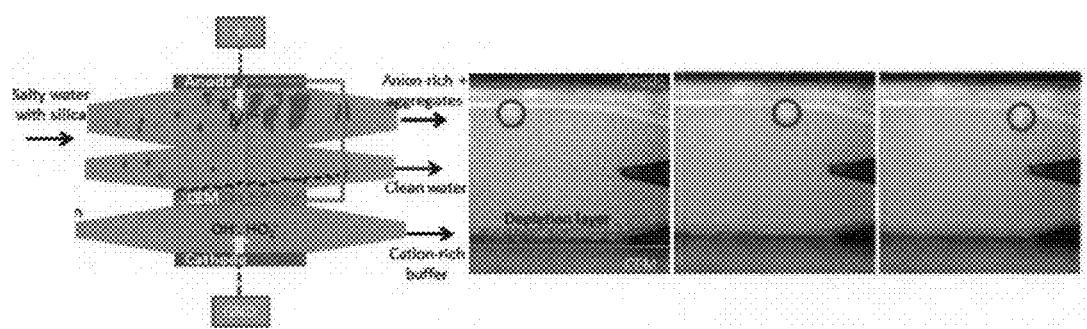
FIG. 20. Schematic of microfluidic ICP-EC system comprising microscope images of coagulate and depletion layers.

In yet another embodiment and as indicated in FIG. 20 by the black points in the right portion of the stream, a non-ionic porous membrane is used to separate or bifurcate the ion depletion zone and the ion enrichment zone. Preferably, the non-ionic porous membrane is located at the at least one desalted outlet of the channel.

In a preferred embodiment, the electric field creates a boundary layer comprising at least one electroconvective vortex proximal to the at least one ion exchange membrane.

Figure 21:
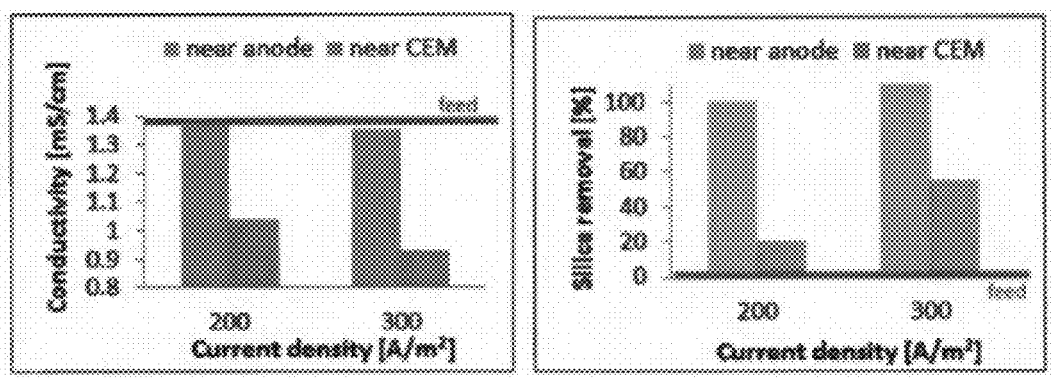
FIG. 21. Salinity reduction, measured by conductivity, and suspended solids reduction.

In another preferred embodiment and as shown in FIGS. 20 and 21, the electric field is created by an electrode and a ground, each located external and parallel to the at least a first channel.

FIG. 19B shows yet another embodiment wherein a second channel is formed between the at least one ground and the at least one ion exchange membrane.

In a preferred embodiment, the second channel is filled with an electrolyte solution.

In an embodiment comprising a second channel, water from the at least one water stream may serve as the electrolyte solution.

In a preferred embodiment, the first water stream comprises salt.

In yet another preferred embodiment, the first water stream comprises biomolecules.

Figure 24:
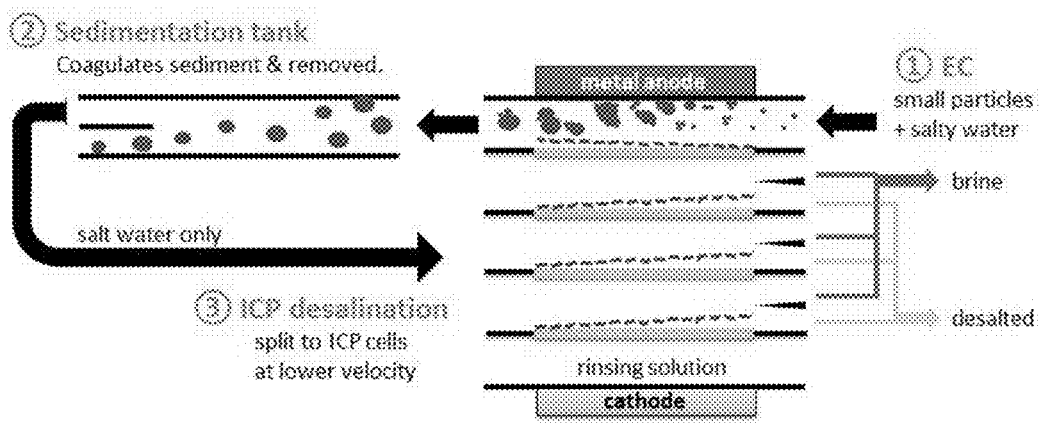
FIG. 24. Continuous multi-cell ICP-EC system with addition of sedimentation tank.

FIG. 24 shows another preferred embodiment comprising at least one sedimentation tank, the at least one sedimentation tank comprising at least one sample inlet, at least one sample outlet and at least one coagulate outlet. Preferably, the at least one sample outlet provides the at least first water stream.

The embodiments described above comprise an electrolytic cell with a cation exchange membrane (CEM) that separates the solutions in contact with the anode and cathode respectively. Through this CEM, only cations can be transported according to the direction of the electric field applied. In the proof of concept experiments, the device was made of polydimethylsiloxane (PDMS) for visualization of process and ease of fabrication. However, for a scaled-up process, other materials can be used as the external support material.

In the ICP-EC process, the feed wastewater containing small pollutants (silica in the proof-of-concept experiment) and salt ions enters the device. In the reaction chamber, the solution undergoes treatment by EC and ICP and exits through bifurcated outlets. ICP phenomenon affects the solution near the CEM. Here, the solution forms an ion depletion zone. Consequently, from the outlet on the CEM side, a desalinated water is obtained. Additionally, any particles in the solution are repelled in the ICP depletion zone. Therefore, the solution exiting through the CEM outlet is free of both salt and colloid particles. The solution near the anode is mainly affected by EC, and colloidal particles in this region are coagulated and form larger chunks. The product from the anode outlet contains large flocs of particles, which can be separated by sedimentation. The recovered solution has reduced particle content and similar salinity as the feed.

Figure 19C:
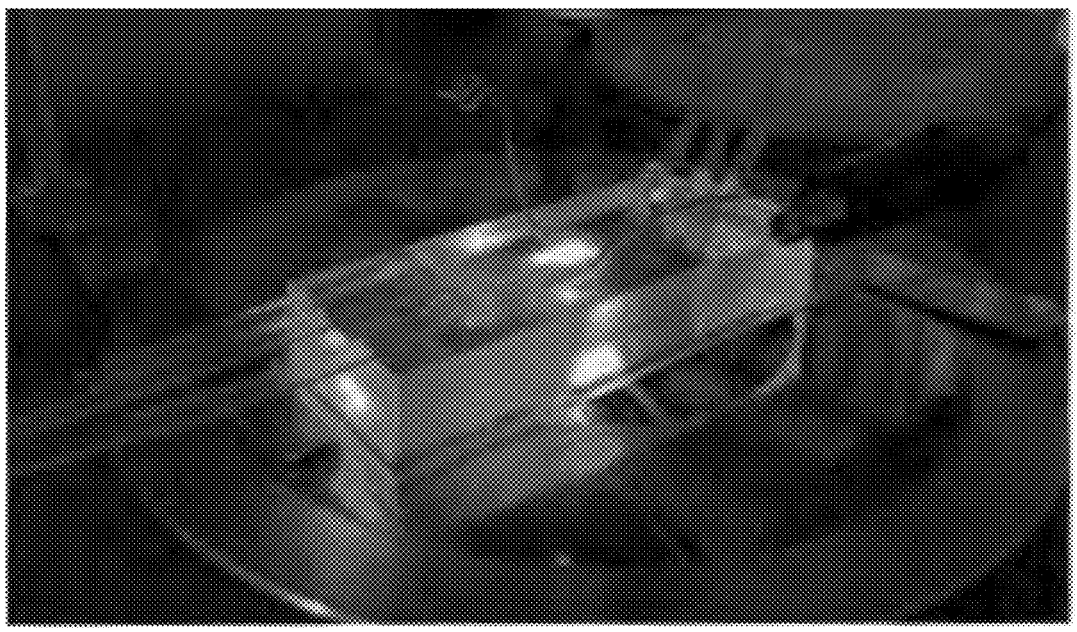

We visualized this method under microscope. A picture of the experimental setup is shown in FIG. 19C. FIG. 20 shows microscopic images from the experiment. The boxed area in the left schematic of FIG. 20 was imaged at different time points. In this experiment, a charged fluorescent dye was added to track the salt movement and map the concentration distribution in the solution. Hence, the dark region represents an ion depletion layer. The white area near the anode results from the colloidal silica and dye coagulates formed as the product of EC. From these images, we can observe the trajectory of a specific EC floc, tracked with a green circle. The EC flocs form in various sizes; some of them are large enough to be seen as clumps in the image, and others are smaller. The aggregates flow out through the anode outlet and sediment in the collection tube.

We also demonstrated the performance of the device quantitatively. The operating parameters are shown in Table 1:

TABLE 1

Operating Parameters of Microfluidic ICP-EC Experiment

| Device dimensions (W × l × D) | | 2 mm × 10 mm × 0.2 mm |
| Electrode material | | Aluminum alloy (sheet) |
| Flowrates | 1 Anode outlet | 180 1Il/min |
| | 1 CEM outlet | 20 1Il/min |
| Flowrate ratio | | Anode:CEM = 9:1 |
| Pollutant concentrations | 1 Colloidal silica | 1000 mg/l |
| | 1 NaCl | 10 mM |

The pollutant removal performance of the system was quantitatively demonstrated by measuring the conductivity and the silica mass. As shown in FIG. 21, for the applied current density of 200-300 Nm2 the conductivity of the channel near CEM decreased up to 30%, which implies up to 30% salt removal. The reduction in salt is the result of depletion zone from ICP. Product from near anode channel was barely affected by ICP, and thus the salt concentration remained the same as the feed.

For silica content analysis, we can see that near the anode, where active EC occurs, almost all silica was removed. Near CEM, the amount of silica also decreased in the outlet. However, this is likely to be due to ICP. Any particles, regardless of their charges, are deflected away from the depletion zone. This explanation was inferred by the product appearance. The product of EC contains sediments of coagulates. In the product of the CEM outlet, no sediments were observed, which suggests that the silica removal resulted from particle deflection of ICP, rather than coagulation.

Figure 22:
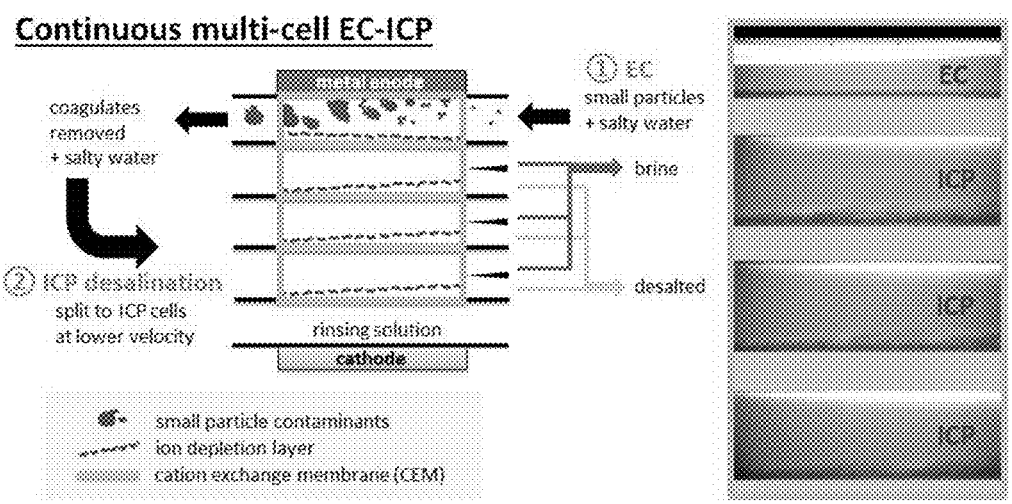
FIG. 22. Continuous multi-cell ICP-EC system.

In yet another embodiment, we modified the single cell EC-ICP to enhance the quality and throughput of the treated water and developed a continuous multi-cell EC-ICP system. In the new system, shown in FIG. 22, the feed water is first treated with EC, where small, colloidal particles are removed from the solution; the product of EC, which contains mostly salt ions, is then desalinated by ICP. In this experiment, we chose silica to model suspended solids in 10 mM NaCl. The recovery of clean water was 45% of the initial feed. As described in Table 2, silica removal was >99%, and salt removal increased linearly with the applied current. We can further increase the salt removal by increasing the channel length or current, or decreasing the recovery ratio or the flow velocity in the ICP cells.

TABLE 2

Performance of continuous, multi-cell EC-ICP. Flowrates: 800 μL/min (vavg = 1 m/min) in EC cell, and 120 μL/min (vavg = 0.25 m/min) each outlet (brine and desalted) of ICP cell.

| Current density [A/m2] | 100 | 200 |
| Silica removal | >99% | >99% |
| Salt removal (reduction in conductivity) | 10% | 20% |
| Electrical energy consumption [Wh/L] | 0.35 | 1.4 |

Figure 23A:
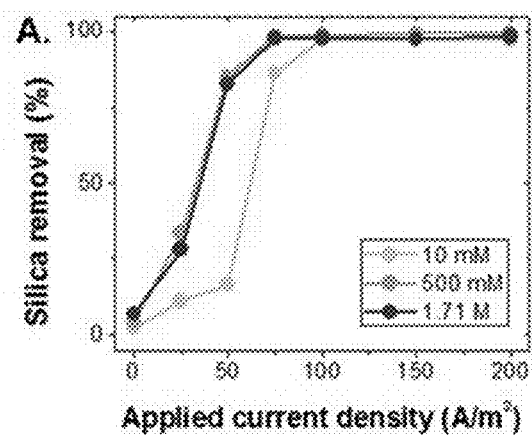
FIGS. 23A, 23B and 23C; EC performance at varying current densities and salinity background.
Figure 23B:
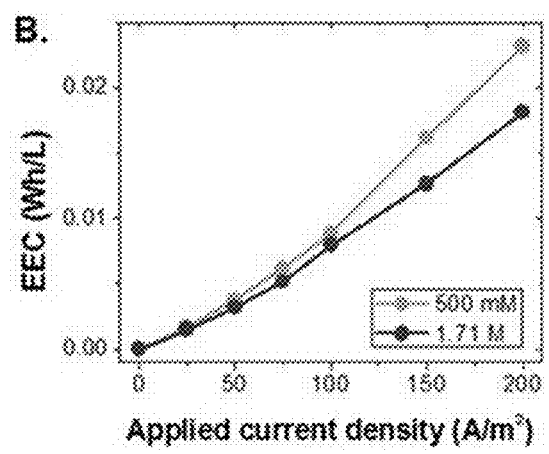
Figure 23C:
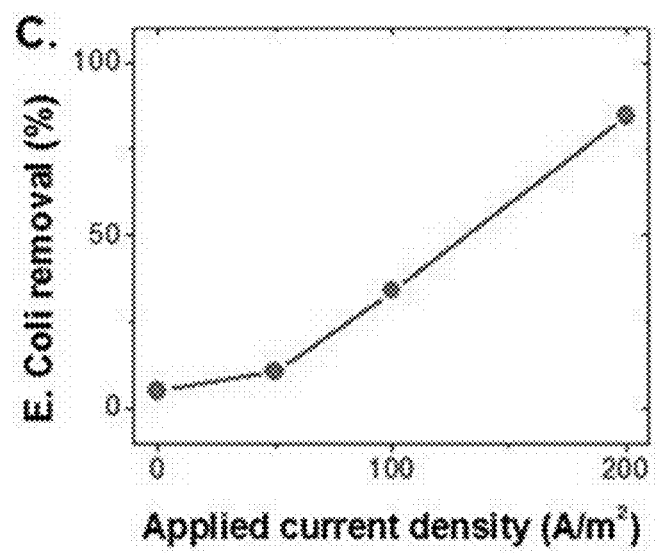

FIGS. 23A-C show that our system can be applied in a wide range of salinity. We performed electrocoagulation at three different salinity levels: 10 mM, 500 mM (seawater), and 1.7M (100,000 TDS, highly concentrated brine) of NaCl. Here, we focused on the suspended solids (silica) removal by EC since ICP at high salinity has been extensively studied in another manuscript [6]. As shown in FIG. 23A, silica removal at 500 mM and 1.7M were similar, with ~100% removal above 75 A/m2, which was slightly lower than the required current level of 100 A/m2 at 10 mM. The electrical energy consumption (EEC) for complete silica removal was 5-10 mWh/L (FIG. 23B). The EEC at 10 mM was estimated to be 55 mWh/L based on previous experiments. The lower EEC at high salinity is largely due to the lower resistance in the solution. The high concentration of electrolyte could have also enhanced the coagulation process.

Additionally, our system was used to remove bacteria (*E. coli*), which are prevalent in river water in many developing countries [11],[12]. The result in FIG. 23C shows effective removal of these bacteria, even at a very high concentration. This shows the flexible applicability of EC to different types of pollutants.

FIG. 24 shows yet another embodiment of the multi-cell EC-ICP. We added a continuous sedimentation tank for a fully continuous operation of the hybrid system to minimize manual operation. The sedimentation tank has a single inlet and two outlets that are stacked vertically. As the coagulates travel along the length of the tank, they settle by gravity and exit through the bottom outlet. The solution from top outlet is free of coagulates and is sent to the ICP desalination channels. The depth of the tank is within the range of a few hundred microns to a few millimeters. The recovery of salt solution from the sedimentation tank can be varied by adjusting the flowrate ratio.

Figure 25:
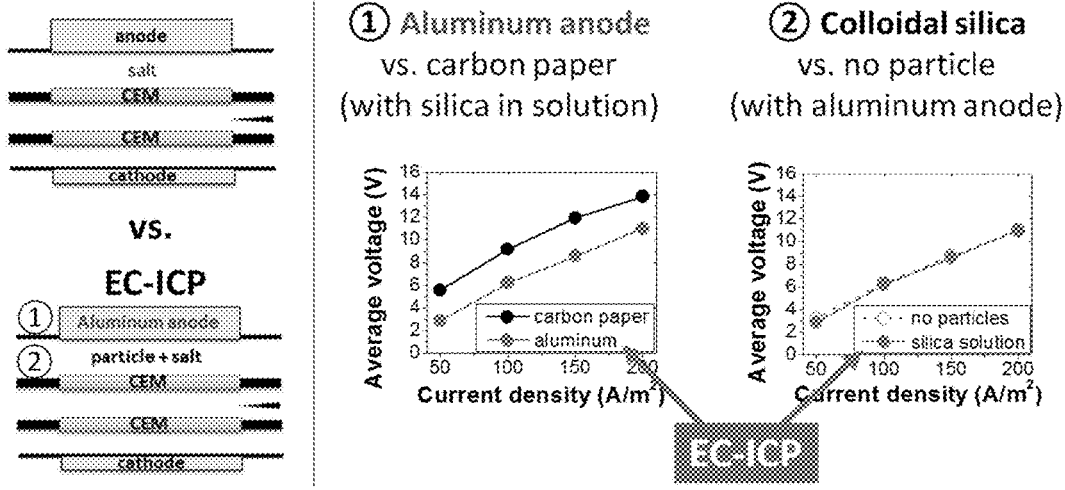
FIG. 25. Energy advantages of hybrid ICP-EC system.
Figure 26:
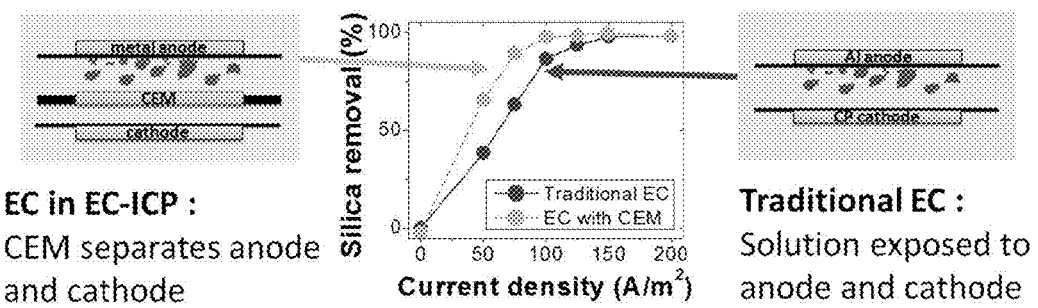
FIG. 26. Higher suspended solids removal in EC portion of hybrid system, compared to conventional EC.

Our invention makes use of the unavoidable Faradaic reaction near the anode to remove small particles, while desalting by ICP. Operating electrocoagulation process in the anode rinsing channel does not increase the voltage drop in the device, therefore can come 'for free' in a given ICP desalination system. We proved this experimentally, as shown in FIG. 25. First, we compared the voltage drop of a device with aluminum anode (EC) and carbon anode (no EC). The results show that EC process does not require a higher voltage drop. Next, we compared the performance of the same device with different solutions running in the anode channel. When salt-only solution was run, no EC occurred because there are no particles to be coagulated. When the solution contained silica nanoparticles, the particles were coagulated by EC. In either case, the voltage drop was exactly the same, which validated our claim that the addition of EC in an ICP device does not incur any additional energy. In a traditional EC device, the solution is exposed to both the anode and cathode. However, in the EC in the hybrid system, the cathode is screened from the solution by ion-exchange membranes. This screening could alter the chemistry of coagulation process and result in different removal profile. Our results as shown in FIG. 26 suggest that the screening effect is in favor of our device because smaller current is required in the hybrid EC to achieve the same removal efficiency, compared to the traditional EC. The electrical resistance of the solution increases with the size of the gap between the electrodes. Consequently, a system with narrower electrode gap can reduce the energy consumption. In a large system, it is difficult to control the size of electrode gap as the gap size becomes smaller. A microfluidic system allows fine control of such parameters.

Although the narrow width reduces electrical resistance, the small gap creates larger tendency for electrode fouling by the coagulates. Therefore, a continuous flow system is more advantageous because the treated solution is continuous flushed away from the electrode. In order to achieve the same coagulate washing in a batch system, highly vigorous mixing may be required, consuming much more mechanical energy.

The following references are incorporated herein by reference in their entirety.

REFERENCES

[1] V. V. Nikonenko, N. D. Pismenskaya, E. I. Belova, P. Sistat, P. Huguet, G. Pourcelly, and C. Larchet, Adv Colloid Interfac 160, 101 (2010).
[2] R. F. Probstein, *Physicochemical Hydrodynamics: An Introduction* (Wiley-Interscience, New York, 2003), 2 edn.
[3] S. J. Kim, S. H. Ko, K. H. Kang, and J. Han, Nat Nanotechnol 5, 297 (2010).
[4] R. Kwak, G. F. Guan, W. K. Peng, and J. Y. Han, Desalination 308, 138 (2013).
[5] R. Kwak, S. J. Kim, and J. Han, Analytical Chemistry 83, 7348 (2011).
[6] K. A. Soni, A. K. Balasubramanian, A. Beskok, and S. D. Pillai, Curr Microbiol 56, 93 (2008).
[7] R. T. Noble, and S. B. Weisberg, Journal of Water and Health 03, 381 (2005).
[8] R. Kwak, V. S. Pham, B. J. Kim, L. Chen, and J. Han, "High-Throughput Saltao-Agent Removal by Ion Concentration Polarization for Water Desalination, Purification, and Monitoring," mTAS 2013, Freiburg, Germany,
[9] V. Kuokkanen, I. Kuokkanen, J. Ramo, and U. Lassi, "Recent Applications of Electrocoagulation in Treatment of Water and Wastewater—a Review," *Green and Sustainable Chemistry*, 2013, 3, 89-121.
[10] R. Kwak, G. Guan, W. K. Peng, and J. Han, "Microscale Electrodialysis: Concentration Profiling and Vortex Visualization", *Desalination*, 308, 2013, 138-146.
[11] D. Shaffer, L. Chaves, M. Ben-Sasson, S. Castrillon, N. Yip., and M. Elimelech, "Desalination and Reuse of High-Salinity Shale Gas Produced Water: Drivers, Technologies, and Future Directions", *Environmental Science and Technology*, 25 Jul. 2013.
[12] G Harris et al., *The New York Times*. Published Mar. 12, 2013.
[13] Pollution C, Board C. Water Quality Monitoring in India—Achievements and Constraints, 2005.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of purifying and/or concentrating a first water stream containing ionic impurities comprising:
   a. directing the water stream in a channel comprising an inlet and an outlet and defined, at least in part by two juxtaposed ion exchange membranes, wherein the ion exchange membranes are characterized by the same charge,
   b. applying a voltage or current in the overlimiting regime across the water stream channel;
      whereby, an ion depletion zone ($d_{de}$) comprising a purified water stream and an ion enrichment zone ($d_{en}$) comprising a concentrated ion aqueous stream are generated and ions are transferred through the ion exchange membranes; collecting the purified water stream and/or the concentrated ion aqueous stream.

2. The method of claim 1, wherein the channel formed by the two juxtaposed ion exchange membranes does not contain a membrane carrying a charge counter to the two juxtaposed ion exchange membranes.

3. The method of claim 1, wherein the two juxtaposed ion exchange membranes are cationic exchange membranes.

4. The method of claim 1, wherein the two juxtaposed ion exchange membranes are anionic exchange membranes.

5. The method of claim 1, further comprising a nonionic porous membrane separating or bifurcating the ion depletion zone and the ion enrichment zone.

6. The method of claim 5, wherein the nonionic porous membrane is located at the outlet of the channel.

7. The method of claim 1 wherein the electric field creates a boundary layer comprising at least one electroconvective vortex proximal to at least one of the two juxtaposed ion exchange membranes.

8. The method of claim 7, wherein the electric field is created by an electrode and a ground each located external and parallel to the channel.

9. The method of claim 8, wherein the electrode forms a second channel with the first of said two juxtaposed ion exchange membranes and the ground forms a third channel with the second of said two juxtaposed ion exchange membranes.

10. The method of claim 9, wherein the second and third channel are filled with an electrolyte solution.

11. The method of claim 10, wherein the electrolyte solution is the first water stream.

12. The method of claim 1 wherein the first water stream comprises salt.

13. The method of claim 1 wherein the first water stream comprises biomolecules.

14. The method of claim 1 further comprising the step of electrocoagulation.

15. The method of claim 14, wherein the electrocoagulation step is conducted simultaneously with the desalination step.

16. The method of claim 14, wherein the solution undergoes the electrocoagulation step first, followed by the desalination step, or vice versa.

17. The method of claim 14, wherein the electric field is created with a metal anode.

18. The method of claim 17, wherein the metal anode is sacrificial.

19. The method of claim 1, wherein the ion exchange membranes are microporous.

20. The method of claim 1, wherein the ion exchange membrane is nanoporous.

* * * * *